(12) United States Patent
Ivry et al.

(10) Patent No.: US 11,544,339 B2
(45) Date of Patent: Jan. 3, 2023

(54) AUTOMATED SENTIMENT ANALYSIS AND/OR GEOTAGGING OF SOCIAL NETWORK POSTS

(71) Applicant: Zencity Technologies Ltd., Tel-Aviv (IL)

(72) Inventors: Ido Ivry, Tel-Aviv (IL); Shiran Golan, Tel-Aviv (IL); Ofri Rom, Ganei Tikva (IL); Shmuel Ur, Shorashim (IL)

(73) Assignee: Zencity Technologies Ltd., Tel-Aviv (IL)

( * ) Notice: Subject to any disclaimer, the term of this patent is extended or adjusted under 35 U.S.C. 154(b) by 0 days.

(21) Appl. No.: 17/200,833

(22) Filed: Mar. 14, 2021

(65) Prior Publication Data
US 2022/0292154 A1 Sep. 15, 2022

(51) Int. Cl.
*G06F 16/9537* (2019.01)
*G06F 16/906* (2019.01)
*G06F 16/9536* (2019.01)
*G06N 20/00* (2019.01)

(52) U.S. Cl.
CPC ........ *G06F 16/9537* (2019.01); *G06F 16/906* (2019.01); *G06F 16/9536* (2019.01); *G06N 20/00* (2019.01)

(58) Field of Classification Search
CPC .............. G06F 16/9537; G06F 16/906; G06F 16/9536; G06N 20/00
See application file for complete search history.

(56) References Cited

U.S. PATENT DOCUMENTS

| | | | |
|---|---|---|---|
| 9,262,481 B1 * | 2/2016 | Le | G06Q 30/0282 |
| 9,336,268 B1 * | 5/2016 | Moudy | G06F 16/24578 |
| 2008/0306826 A1 * | 12/2008 | Kramer | G06Q 30/0212 705/14.14 |
| 2011/0302124 A1 * | 12/2011 | Cai | G06F 16/353 707/723 |
| 2012/0203751 A1 * | 8/2012 | Srivastava | G06F 16/24575 707/706 |
| 2012/0278349 A1 * | 11/2012 | Bidlack | G06F 16/215 707/758 |

(Continued)

OTHER PUBLICATIONS

Empath "Vocal Emotion Recognition Test", Empath Inc., 10 P., 2020.

(Continued)

*Primary Examiner* — Ashish Thomas
*Assistant Examiner* — Jedidiah P Ferrer

(57) ABSTRACT

There is provided a method of automatically tagging social network posts with geo-location tags, comprising: for each of a plurality of user generated content items uploaded to a social network from a plurality of different client devices: selecting a specific geographic region mapping dataset of a plurality of geographic region mapping datasets corresponding to a specific geographic region identified by an analysis of the respective user generated content post, mapping by the specific geographic region mapping dataset, a generic term to a specific geographic location within the specific geographic region, and tagging the respective user generated content item with a geo-location tag of the specific geographic location within the specific geographic region.

13 Claims, 9 Drawing Sheets

(56) References Cited

U.S. PATENT DOCUMENTS

| | | | | |
|---|---|---|---|---|
| 2013/0073336 | A1* | 3/2013 | Heath | G06Q 30/02 |
| | | | | 705/7.29 |
| 2014/0089296 | A1* | 3/2014 | Burris | G06F 16/29 |
| | | | | 707/722 |
| 2014/0214819 | A1* | 7/2014 | Aitchison | G06F 16/29 |
| | | | | 707/724 |
| 2015/0278298 | A1* | 10/2015 | Boldyrev | G06F 16/58 |
| | | | | 707/769 |
| 2017/0067748 | A1* | 3/2017 | Glover | G01C 21/20 |
| 2017/0270180 | A1* | 9/2017 | State | G06F 16/9537 |
| 2018/0182381 | A1* | 6/2018 | Singh | G06F 16/9537 |
| 2019/0325060 | A1* | 10/2019 | Fenoglio | G06F 16/285 |

OTHER PUBLICATIONS

Geisler Mesevage "8 Sentiment Analysis Tools to Monitor Social Media Data", MonkeyLearn, Analyze Your Unctructed Text With Sentiment Analysis, Blog, 9 P., Apr. 20, 2020.

Melzer et al. "How Do We Recognize Emotion From Movement? Specific Motor Components Contribute to the Recognition of Each Emotion", Frontiers in Psychology, 10: 1389-1-1389-14, Jul. 3, 2019.

Scchclca ct al. "Twittcr Data Clustcring and Visualization", 2016 23rd Intcrnational Conference on Telecommunications, ICT, Thessalonik, Greece, May 16-18, 2016, p. 1-5, May 16, 2016.

SpaCy "Lingusitic Features", SpaCy, Explosion, 59 P., 2016-2021.

Tripathy et al. "Theme Based Clustering of Tweets", Proceedings of the 1st IKDD Conference on Data Sciences, CoDS '14, New Delhi, India, Mar. 20-22, 2014, p. 1-5, Mar. 20, 2014.

Wikipedia "Emotional Prosody", Wikipedia. 5 P., Last Edited Feb. 1, 2021.

Wikipedia "Hedonic Treadmill", Wikipedia, 9 P., Last Edited Dec. 31, 2020.

* cited by examiner

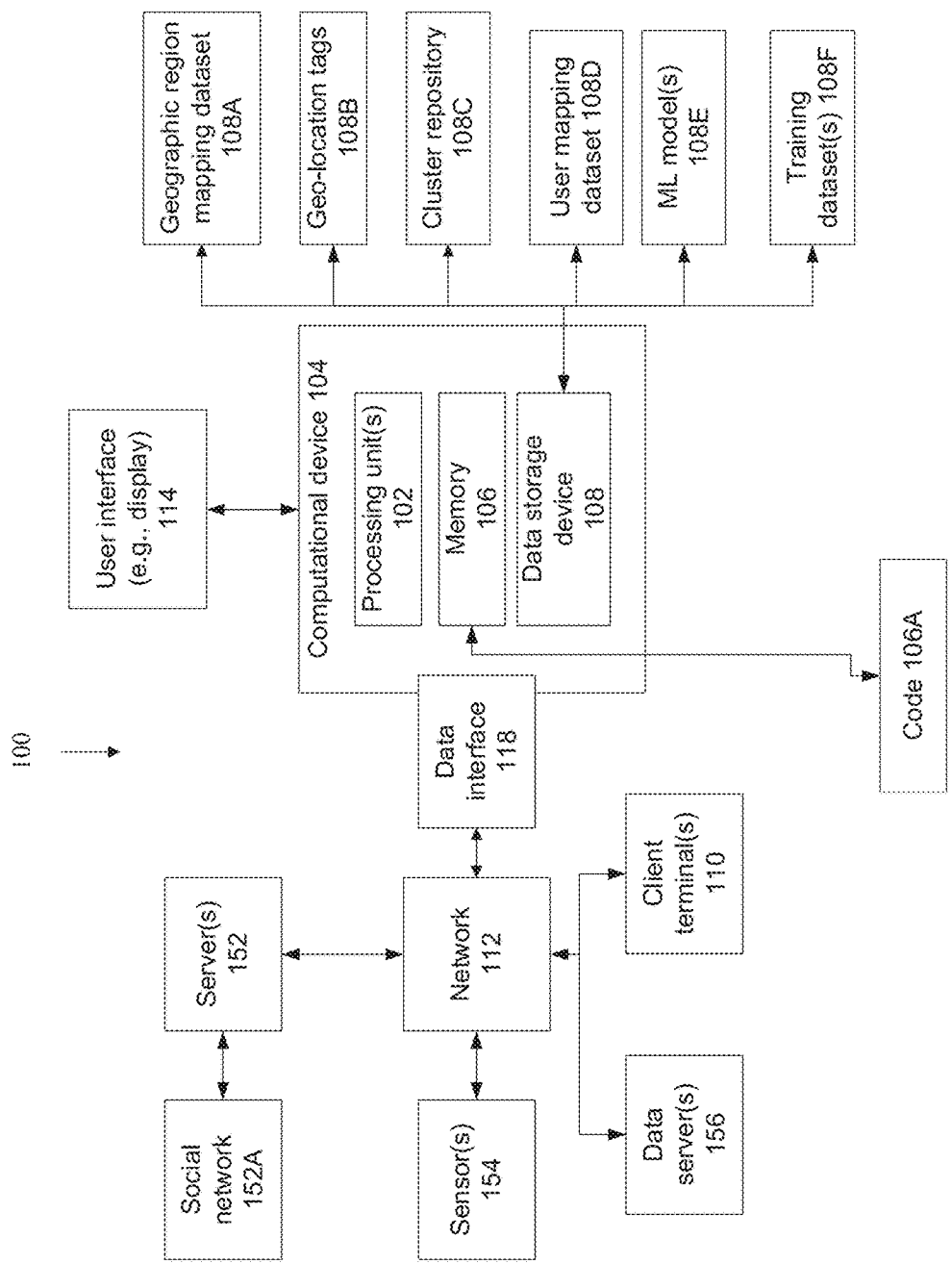

AUTOMATED SENTIMENT ANALYSIS AND/OR GEOTAGGING OF SOCIAL NETWORK POSTS

FIELD AND BACKGROUND OF THE INVENTION

The present invention, in some embodiments thereof, relates to data mining of user generated content items uploaded to a social network and, more specifically, but not exclusively, to systems and methods for geo-tagging and/or sentiment analysis of user generated content items uploaded to a social network.

Users posts to a social network may be analyzed to obtain a wide range of information. However, the posts to the social network are numerous while at the same time lacking in certain data to enable automated systematic approaches to work accurately. For example, many content items are lacking geo-tags. In another example, a sentiment analysis may be performed using content items to obtain an overall sentiment of the users towards a topic or a set of topics.

SUMMARY OF THE INVENTION

According to a first aspect, a method of automatically tagging social network posts with geo-location tags, comprises: for each of a plurality of user generated content items uploaded to a social network from a plurality of different client devices: selecting a specific geographic region mapping dataset of a plurality of geographic region mapping datasets corresponding to a specific geographic region identified by an analysis of the respective user generated content post, mapping by the specific geographic region mapping dataset, a generic term to a specific geographic location within the specific geographic region, and tagging the respective user generated content item with a geo-location tag of the specific geographic location within the specific geographic region.

According to a second aspect, a method of computing a sentiment for a specific topic, comprises: receiving a query indicating a specific topic defined for a specific geographic region, selecting a subset of a plurality of user generated content items uploaded to a social network from a plurality of different client terminals, discussing the topic and having geo-location tags matching the specific geographic region, extracting data captured by at least one sensor depicting the specific geographic region, inputting a combination of the subset of the plurality of user generated content items and the extracted data captured by the at least one sensor into a machine learning (ML) model trained on a training dataset of a combination of user generated content items and data captured by the at least one sensor and labelled with an indication of a sentiment value, and obtaining a target sentiment value for the specific topic as an outcome of the ML model.

According to a third aspect, a system for automatically computing a sentiment for a specific topic, comprises: a client terminal executing a code for, extracting data captured by at least one sensor depicting a specific geographic location corresponding to a respective topic, providing to a server, an indication of the specific geographic location, the respective topic, and the data captured by the at least one sensor, and receiving, from the server, a target sentiment value for the respective topic, wherein the server executes a code for: for each of a plurality of user generated content items uploaded to a social network from a plurality of different client devices: selecting a specific geographic region mapping dataset of a plurality of geographic region mapping datasets corresponding to a specific geographic region identified by an analysis of the respective user generated content post, mapping by the specific geographic region mapping dataset, a generic term to a specific geographic location within the specific geographic region, tagging the respective user generated content item with a geo-location tag of the specific geographic location within the specific geographic region, clustering the user generated content items according to geo-location tags and topics into a plurality of topics, selecting at least one cluster matching the indication of the specific geographic location and the respective topic received from the client terminal, inputting a combination of a plurality of user generated content items of the selected at least one cluster and the extracted data captured by the at least one sensor received from the client terminal into a machine learning (ML) model trained on a training dataset of a combination of user generated content items and data captured by the at least one sensor and labelled with an indication of a sentiment value, and obtaining a target sentiment value for the respective topic as an outcome of the ML model.

In a further implementation of the first and third aspects, mapping comprises mapping by the specific geographic region mapping dataset in association with a time dataset that links between generic terms and time, a combination of the generic term and a timestamp of the respective user generate content item, to the specific geographical location.

In a further implementation of the first and third aspects, the same generic term, when used with different geographic region mapping datasets, is mapped to different geographic locations within different geographic regions corresponding to the different geographic region mapping dataset.

In a further implementation of the first and third aspects, further comprising creating the specific geographic region mapping dataset by: obtaining a plurality of content items each with existing geotags, clustering the plurality of content items into a plurality of clusters according to terms mentioned in the content items, wherein each respective cluster represents a respective generic term, creating, for each respective cluster, entries for each of a plurality of specific geographic region mappings datasets, each respective entry includes a respective specific term of the respective cluster entered into a respective specific geographic region mapping dataset corresponding to the geotag of the content item of the respective specific term, feeding each generic term into a search engine that searches the internet and/or content posted on a social network to obtain search results, analyzing each search result to extract a specific term corresponding to the generic term and a geographic location, and creating a respective entry for each respective specific term, in a respective specific geographic region mapping dataset corresponding to the geographical location of the respective specific term.

In a further implementation of the first and third aspects, further comprising: receiving a query indicating a specific spatiotemporal event defined for an event time interval in an event geographic location, and selecting user generated content items having geo-location tags matching the event geographic location and timestamps matching the event time interval.

In a further implementation of the first and third aspects, receiving the query indicating the specific spatiotemporal event comprises accessing a database of a plurality of spatiotemporal events that are scheduled to occur and/or that have already occurred in a specific geographic region.

In a further implementation of the first and third aspects, receiving the query indicating the specific spatiotemporal event comprises: clustering user generated content items tagged with geo-location tags into at least one cluster denoting an event according to an analysis of terms in the respective user generated content item, and when a set of user generated content item members of at least one cluster have a common geo-location tag, defining the spatiotemporal event corresponding to the event of the cluster and the specific geographic location corresponding to the common geo-location tag.

In a further implementation of the first and third aspects, further comprising performing a sentiment analysis of the specific spatiotemporal event by performing a sentiment analysis of user generated content items having geo-locations tags matching the specific geographic location of the specific spatiotemporal event.

In a further implementation of the first and third aspects, further comprising geographically clustering the plurality of geo-tagged user generated content items into a plurality of geographic clusters each denoting a respective geographic region, for each respective geographic cluster denoting each respective geographic region: clustering the plurality of geo-tagged user generated content items of the respective geographic region into a plurality of topic clusters each denoting a respective topic, selecting at least one topic cluster according to a specific topic, and analyzing the user generated content item members of the selected at least one topic cluster.

In a further implementation of the first and third aspects, clustering comprises clustering the plurality of geo-tagged user generated content items into the plurality of topic clusters in a respective geographic location.

In a further implementation of the first and third aspects, further comprising performing a sentiment analysis of the specific topic by performing a sentiment analysis of user generated content items in the selected at least one topic cluster.

In a further implementation of the first and third aspects, further comprising excluding user specific identifying data from the user generated content items in the selected at least one topic cluster, wherein the excluding is performed such that the sentiment analysis is performed as a summary without data that identifies specific users.

In a further implementation of the first and third aspects, the plurality of topic clusters are for a plurality of topics identified according to an analysis of topics raised by residents of a respective geographic region providing queries to a central query handling center.

In a further implementation of the first and third aspects, the plurality of topic clusters are for a plurality of topics that are common for each of a plurality of geographic clusters.

In a further implementation of the first and third aspects, further comprising for each of the plurality of user generated content items: identifying a user that uploaded the respective user generated content item, mapping the user to the specific geographic region using a user mapping dataset, and selecting the specific geographic region mapping dataset corresponding to the specific geographic region mapped by the user mapping dataset for the user.

In a further implementation of the first and third aspects, further comprising creating the user mapping dataset by at least one member of a group consisting of: (i) accessing an address field of a user profile of the user posted on the social network, and creating an entry in the user dataset that maps the user to the geographic region of the address field, (ii) analyzing a plurality of user generated content items posted by the user to identify a common geographic region, and creating an entry in the user mapping dataset that maps the user to the common geographic region, (iii) querying a home address database based on the user, and creating an entry in the user mapping dataset that maps the user to the geographic region corresponding to the home address, (iv) querying a phone dataset of a certain geographic region based on the user, and when an entry exists in the phone dataset, creating an entry in the user mapping dataset that maps the user to the certain geographic region, (v) analyzing content and/or geotags of user generated content items previously posted by the user to identify a geographic region, and (vi) analyzing geographic regions of other user linked to a user profile of the user.

In a further implementation of the second and third aspects, one of: (i) wherein the specific topic is defined for a specific geographic location in the specific geographic region, wherein selecting comprises selecting the subset of the plurality of user generated content items having geo-location tags matching a specific spatiotemporal event, wherein extracting comprises extracting data captured by at least one sensor depicting the specific geographic location, and (ii) wherein the specific topic is a specific spatiotemporal event defined for a specific time interval in a specific geographic location in the specific geographic region, wherein selecting comprises selecting the subset of the plurality of user generated content items having geo-location tags and timestamps matching the specific spatiotemporal event, wherein extracting comprises extracting data captured by at least one sensor depicting the specific geographic location at the specific time interval.

In a further implementation of the second and third aspects, further comprising: computing a sentiment baseline as an outcome of inputting into the ML model a baseline plurality of user generated content items having a timestamp external to a specific time interval and/or geographic location external to a specific geographic location of the specific spatiotemporal event, and analyzing the sentiment value for the specific spatiotemporal event relative to the sentiment baseline.

In a further implementation of the second and third aspects, further comprising: computing a sentiment baseline as an outcome of inputting into the ML model the baseline plurality of user generated content items having a timestamp external to a specific time interval of a specific spatiotemporal event and geographic location matching a specific geographic location of the specific spatiotemporal event, and analyzing the sentiment value for the specific spatiotemporal event relative to the sentiment baseline.

In a further implementation of the second and third aspects, further comprising: computing a sentiment baseline as an outcome of inputting into the ML model the baseline plurality of user generated content items having a timestamp matching a specific time interval of a specific spatiotemporal event and geographic location external to a specific geographic location of the specific spatiotemporal event, and analyzing the sentiment value for the specific spatiotemporal event relative to the sentiment baseline.

In a further implementation of the second and third aspects, a first historical sentiment profile of a plurality of sentiment values computed over a historical time interval computed for the geographic location external to the geographic region of the specific spatiotemporal event has a distribution that is similar to a second historical sentiment profile of a plurality of sentiment values computed over the historical time interval for the geographic region of the specific spatiotemporal event.

In a further implementation of the second and third aspects, further comprising: computing a sentiment baseline as an outcome of inputting into the ML model a baseline plurality of user generated content items indicating content external to a specific spatiotemporal event and having a timestamp matching to a specific time interval of the specific spatiotemporal event and/or geographic location matching a specific geographic location of the specific spatiotemporal event, and analyzing the sentiment value for the specific spatiotemporal event relative to the sentiment baseline.

In a further implementation of the second and third aspects, further comprising: clustering the subset of the plurality of user generated content items into at least two clusters according to a respective user type, for each of the at least two clusters, computing a respective cluster sentiment value as an outcome of inputting into the ML model user generated content items of the respective cluster, thereby computing a plurality of cluster sentiment values, and analyzing the plurality of cluster sentiment values by evaluating a first cluster sentiment value relative to a second cluster sentiment value.

In a further implementation of the second and third aspects, further comprising: identifying a plurality of users that posted the plurality of user generated content items, and wherein performing the sentiment analysis comprises: computing a sentiment baseline as an outcome of inputting into the ML model a baseline plurality of user generated content items comprising a plurality of historical user generated content posted by the plurality of user prior to a specific spatiotemporal event, and analyzing the sentiment value for the specific spatiotemporal event relative to the sentiment baseline.

In a further implementation of the second and third aspects, further comprising computing an increase in sentiment for the specific spatiotemporal event relative to the sentiment baseline, and/or computing a descent rate from the increase in sentiment for the specific spatiotemporal event until the sentiment baseline, the descent rate computed by iteratively computing the sentiment using corresponding sequentially posted user generated content items, wherein the descent rate compared to the sentiment baseline indicates an impact of the spatiotemporal event.

In a further implementation of the second and third aspects, the plurality of historical user generated content items match the specific geographic region of the specific spatiotemporal event prior to the specific spatiotemporal event.

In a further implementation of the second and third aspects, further comprising computing an increase in sentiment for the specific spatiotemporal event relative to the sentiment baseline, and/or computing a descent rate from the increase in sentiment for the specific spatiotemporal event until the sentiment baseline, the descent rate computed by iteratively computing the sentiment using corresponding sequentially posted user generated content items, wherein the descent rate compared to the sentiment baseline indicates an impact of the spatiotemporal event.

In a further implementation of the second and third aspects, further comprising: iteratively inputting into the ML model, a historical combination of the subset of the plurality of user generated content items and the extracted data captured by the at least one sensor obtained for a historical plurality of time intervals, to obtain a plurality of historical sentiment values indicating a baseline sentiment profile, inputting the baseline sentiment profile into a sentiment ML model that generates an outcome a predicted sentiment value for a current time interval corresponding to a time interval of the sentiment value, and analyzing the sentiment value relative to the predicted sentiment value.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a block diagram of components of a system for automatically tagging social network posts with geo-location tags and/or computing a sentiment for a specific topic from social network posts and sensor data, in accordance with some embodiments of the present invention;

DESCRIPTION OF SPECIFIC EMBODIMENTS OF THE INVENTION

Figure 2A:
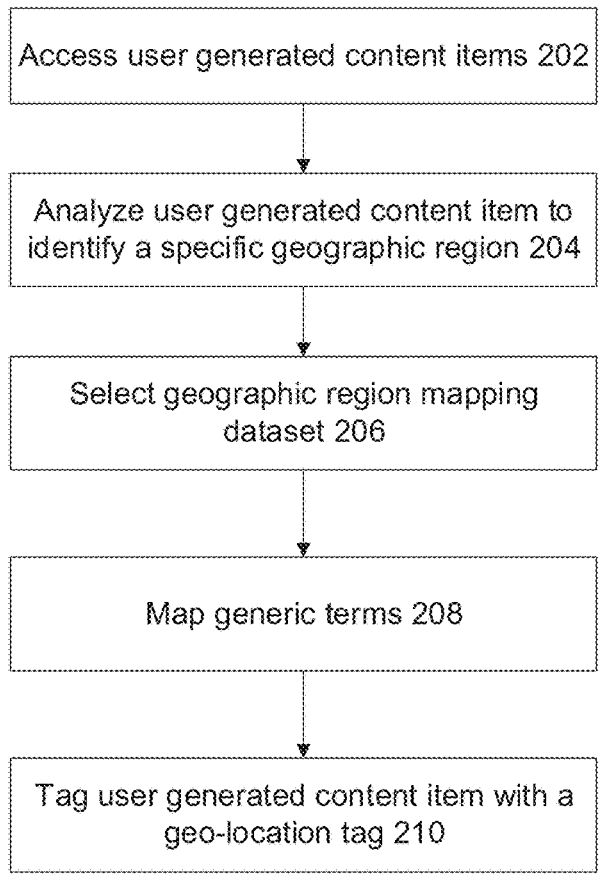
FIG. 2A is a flowchart of a process of automatically tagging social network posts with geo-location tags, in accordance with some embodiments of the present invention.

The present invention, in some embodiments thereof, relates to data mining of user generated content items uploaded to a social network and, more specifically, but not exclusively, to systems and methods for geo-tagging and/or sentiment analysis of user generated content items uploaded to a social network.

An aspect of some embodiments of the present invention relates to systems, methods, an apparatus, and/or code instructions (e.g., stored on a memory and executable by one or more processors) for automatically tagging social network posts with geo-location tags. For some respective user generated content item uploaded to a social network from different client devices, a specific geographic region mapping dataset is selected from multiple geographic region mapping datasets. The multiple geographic region mapping datasets may correspond, for example, to different cities. Each specific geographic region dataset corresponds to a specific geographic region. The specific geographic dataset is selected according to a corresponding specific geographic region identified by an analysis of the respective user generated content post, for example, identifying a city discussed in the respective post, in replies to the post, and/or other posts by the same user. A generic term is mapped to a specific geographic location within the specific geographic region by the specific geographic region mapping dataset. For example, the term "Main Street" is a generic term, referring to multiple different main streets in different cities. For a specific city identified in the respective content item, the term Main Street is mapped to a specific location in the city by the mapping dataset for the specific city. The respective user generated content item is tagged with a geo-location tag of the specific geographic location within the specific geographic region. Continuing the abovementioned example, the respective content item is geo-tagged with the specific location for main street in the specific city.

An aspect of some embodiments of the present invention relates to systems, methods, an apparatus, and/or code instructions for computing a sentiment for a specific topic. A query indicating a specific topic defined for a specific geographic region is obtained, for example, parking issues within a specific city, garbage removal within the specific city, and cultural events within the specific city. A subset of user generated content items (uploaded to a social network from different client terminals) that discuss the topic and have geo-location tags matching the specific geographic region is selected. The geo-location tags may be automatically generated, as described herein. Data captured by sensor(s) depicting the specific geographic region is obtained, for example, videos from street security cameras filming streets of the specific city, and/or audio recording from microphones capturing sounds of the streets of the specific city. A combination of the subset of the user generated content items and the extracted data captured by the sensor(s) is fed into a machine learning (ML) model. The ML model is trained on a training dataset of multiple combinations of user generated content items and data captured by sensor(s) and labelled with an indication of a sentiment value. A target sentiment value for the specific topic as an outcome of the ML model.

As used herein, the terms "posts" and "user generated content items" and "content items" are interchangeable.

As used herein the terms "geo-location tags" and "geo-tags" are interchangeable.

At least some implementations of the systems, methods, device, and/or code instructions described herein addresses the technical problem of automatically generating a geolocation tag to user generated content items (posted on a social network) that do not have an existing associated tag. At least some implementations of the systems, methods, device, and/or code instructions described herein improve the technical field of automatically generating a geolocation tag to user generated content items (posted on a social network) that do not have an associated tag.

At least some implementations of the systems, methods, device, and/or code instructions described herein addresses the technical problem of increasing the accuracy of clustering user generated content items (posted on a social network) according to topics. At least some implementations of the systems, methods, device, and/or code instructions described herein addresses the technical problem of increasing the number of user generated content items that may be accurately clustered according to topics. Each cluster may be analyzed, for example, for computing a sentiment for the topic based on content items related to the topic associated with the cluster. At least some implementations of the systems, methods, device, and/or code instructions described herein improve the technical field of automated sentiment analysis performed on content items in a topic cluster, by increasing the accuracy of content items in the topic cluster, and/or increasing the number of content items in the topic cluster.

The volume of social media information is staggering, but many of the posts do not have associated geolocation tags, which reduces accuracy when clustering by location, and/or reduces the number of posts that are available for clustering. In one standard approach, the posts on the social network (e.g., message, blogs, feedback responses, comments) are clustered according to topics and/or subtopic, where geotags of the posts are also used for clustering. For example, a harvester API extracts posts with geotags from the social network. The extracted data is processed, for example, to remove duplicates, normal words, remove noise, remove irrelevant data, and the like. The processed posts are clustered according to topic and according to geographic locations. Data may be visualized, for example, posts for a certain topic may be plotted as dots or a graph on a map per geographic location. By looking at the data, a user may visually determine which geographic regions have the highest posts for the topic, which topics are being discussed, how much the topics are discussed, and/or the distribution of posts on the topic across the map. However, such approaches are dependent on the geotags assigned to the posts. Such geotags are not necessarily available, for example, users may deactivate the feature that assigns tags, use a computer without a location identifier (e.g., desktop computer without a global positioning device (GPS)), turn off their GPS device, and/or post without the geotag. Moreover, such approaches are dependent on identifying topics discussed within the posts, which leaves out posts that are implicitly related to the topic, and/or excludes topics that are not explicitly discussed in the posts.

At least some implementations of the systems, methods, device, and/or code instructions described herein address the above mentioned technical problem, and/or improve the above mentioned technology, by automatically creating geotags for content items without geotags. Assigning geotags to posts that are obtained without geotags increases the number of posts available for clustering, and/or improves accuracy of a sentiment analysis performed on the posts.

In at least some implementations, the improvement in the ability to automatically create geotags is by using a specific geographic region mapping dataset, for example, a respective mapping dataset for each city. The mapping dataset maps generic terms in each post to specific locations within the geographic region, for example, to specific addresses and/or global positioning (GPS) locations within a city. The created geotag includes the specific location within the geographic region (e.g., city). The generic terms cannot be used to create geotags without the mapping dataset, since each generic term refers to different possible locations. For example, the term "library" refers to all libraries at all locations, rendering the user of the generic term useless without the mapping dataset. Using the mapping dataset, the specific library is identified.

At least some implementations of the systems, methods, device, and/or code instructions described herein address the technical problem of increasing accuracy of a sentiment analysis of user content posted to a social network. At least some implementations of the systems, methods, device, and/or code instructions described herein improve the technical field of computing a sentiment analysis of user content posted to a social network. Standard approaches to sentiment analysis analyze a single content item.

Sentiment analysis is a machine learning tool used to analyze text (documents, online reviews, social media posts, etc.) and determine the sentiment of opinions, for example, on a scale from negative to positive. Also called "opinion mining", this analysis is particularly helpful to monitor brand sentiment on social media. Using AI, sentiment analysis tools are trained to classify social media text for opinion polarity, instantaneously and in real time. It's a cost-effective way to monitor huge volumes of opinion data that humans simply would not be able to process efficiently. And, with the use of natural language understanding (NLU), computers can understand text just like a human would. Such tools receive a post to a social network, and figure out the topic and whether the person writing about it has positive or negative feeling.

At least some implementations of the systems, methods, device, and/or code instructions described herein address the above mentioned technical problem, and/or improve the technology of machine learning, and/or the technology of sentiment analysis. The improvement may be obtained by computing a sentiment analysis for a topic and/or spatiotemporal event by inputting into a trained machine learning mode, a combination of data obtained from sensor(s) (e.g., frames and/or videos from street security cameras, and/or audio obtained from street microphones) and user postings to a social network. The ML model generates an outcome indicating the sentiment value. The user posts may be selected from a cluster corresponding to the topic and/or event. The cluster includes user posts having timestamps and/or geotags corresponding to the time and/or geographic location of the spatiotemporal event and/or of the topic. The improvement may be obtained by computing a baseline sentiment, and comparing the baseline sentiment to a sentiment computed for the spatiotemporal event and/or topic. The baseline may be, for example, before and/or after the event for the same location, by the same posters before and/or after the spatiotemporal event, during the event for a nearby location that is similar to the location of the spatiotemporal event. The baseline may be created by another ML model that predicts sentiment values based on an input of a historical set of sentiment values. The predicted sentiment value represents a baseline sentiment. A current sentiment value is computed to the baseline, i.e., the predicted sentiment value. The baseline may indicate for example, whether people participating in the event perceived the event positively or negatively, and/or whether people not participating in the event perceived the event positively or negatively. For example, whether people participating in a parade enjoyed the performance and/or whether people living on the streets where the parade passed by complained about noise and/or garbage due to the parade.

At least some implementations of the systems, methods, device, and/or code instructions described herein address the technical problem of computing a sentiment value for a spatiotemporal event and/or topic. At least some implementations of the systems, methods, device, and/or code instructions described herein improve the technical field of computing a sentiment analysis for a spatiotemporal event. For example, performing a sentiment analysis of Thanksgiving Parade on High Street on 28 Nov. 2019 in Chicago. Using an existing approach, user posts to social media are first screened to identify posts with geotags indicating High Street in Chicago, and/or that explicitly mention the Thanksgiving Parade in Chicago (since there are multiple such parades in different cities, so just mentioning Thanksgiving Parade does not indicate where the parade was held), and with a timestamp of Nov. 28, 2019. A standard sentiment analysis is performed on these identified social media posts. It is noted that the number of identified posts may be small, since to be included in the analysis the post needs to meet multiple criteria (i.e., geolocation tag and timestamp). In contrast, at least some implementations of the systems, methods, device, and/or code instructions described herein increase the number of posts in the sentiment analysis, and/or increase the accuracy of the sentiment analysis by including images and/or audio of the parade obtained from sensors at the location and/or time of the parade, optionally using automatically generated geotags created using a Chicago mapping dataset. The sentiment analysis may be performed over time optionally by establishing a sentiment baseline. For example, for people who attended the parade, their sentiment before, during and after the parade, and/or for people who live where the parade passed (e.g., before, during and after the parade). A cluster analysis may be performed per topic on the geotagged posts, and the sentiment analysis may be performed per topic. For example, to determine whether people who live where the parade passes complain about garbage the next day and/or to determine whether people who attended the parade were happy with the music.

At least some implementations of the systems, methods, device, and/or code instructions described herein address the technical problem of clustering user generated content items. At least some implementations of the systems, methods, device, and/or code instructions described herein improve the technology of automatically clustering user generated content items. The topic clusters may be improved in comparison to existing clustering approaches, such as approaches that cluster based only on terms mentioned in the content items. The improvement may be due to the improved ability to automatically create geo-tags to content items, even where there are no existing geo-tags, and even when generic terms are used. The improvement may be an increase in the accuracy of the locations of the geo-tags, using the specific mapping dataset. The improvement may be an increase in the number of content items being clustered, based on the additional content items that are assigned geo-tags. The improvement may be an increase in accuracy of a sentiment analysis performed on the cluster(s), since the content items in the cluster are relevant to the topic of the cluster and/or since there are more content items in the cluster. Content items are more relevant to the topic, since they occur at the same time and/or same specific location as the topic of the cluster. Such relevant content items may be identified and assigned to the cluster, when the content items do not explicitly mention the topic. For example, for a topic of complaints about a street parade, the content items in the cluster are more relevant, since they occur in the time and/or specific location of the street parade, even when they do not mention the street parade explicitly. For example, a content item complaining about noise and/or garbage is attributed to the street parade when the geo-tag and/or timestamp correspond to the time and/or location of the street parade, even when the content item does not explicitly mention the street parade. The improvement may be due to the use of external datasets to determine the topics for clustering, which may result in different clusters than that obtained by existing clustering approaches. The use of external datasets, for example, queries by residents to a central call center of the city, are used to create clusters of topics that are of interest to managers of the city. The improvement may be an increase in accuracy of a sentiment analysis performed for an event and/or topic, by analyzing changes in the sentiment analysis before and after the event and/or topic, and/or by analyzing rates of changes in the sentiment analysis, for example, a rate of return to a baseline.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the terms/phrases "social network posts" and "user generated content items" are interchangeable.

Figure 2B:
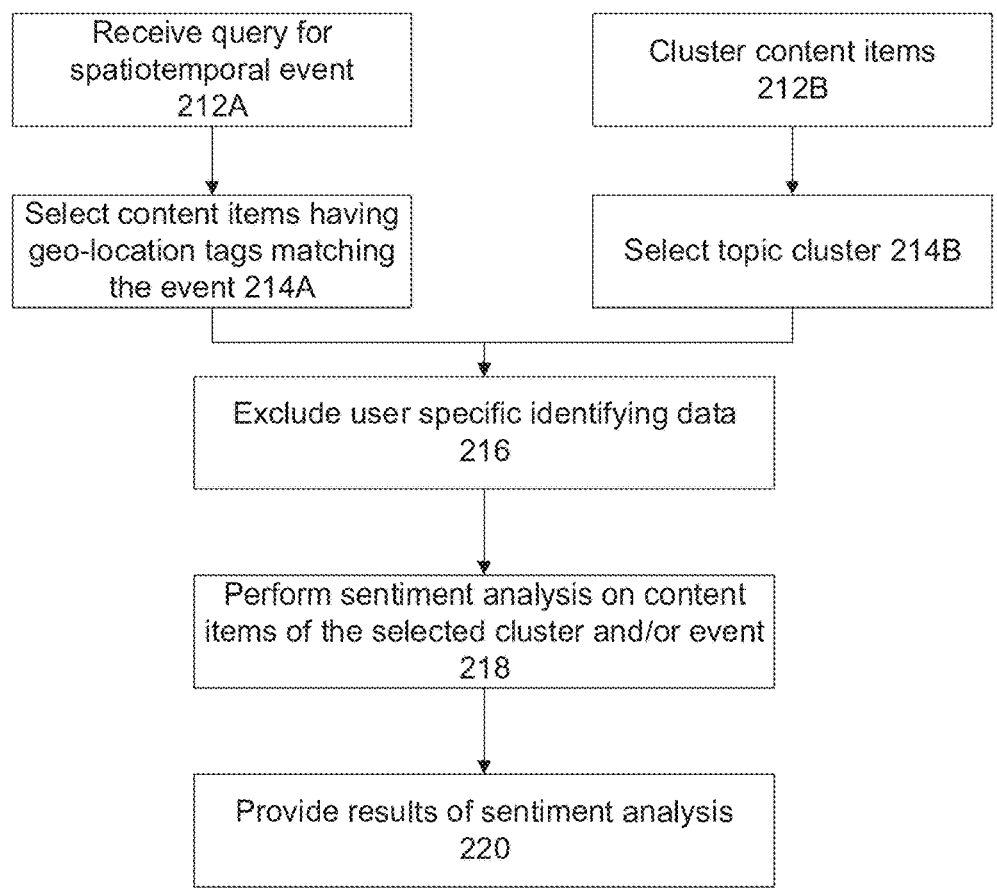
FIG. 2B is a flowchart of a process of computing a sentiment for a specific topic from the automatically tagged social network posts, in accordance with some embodiments of the present invention.
Figure 3:
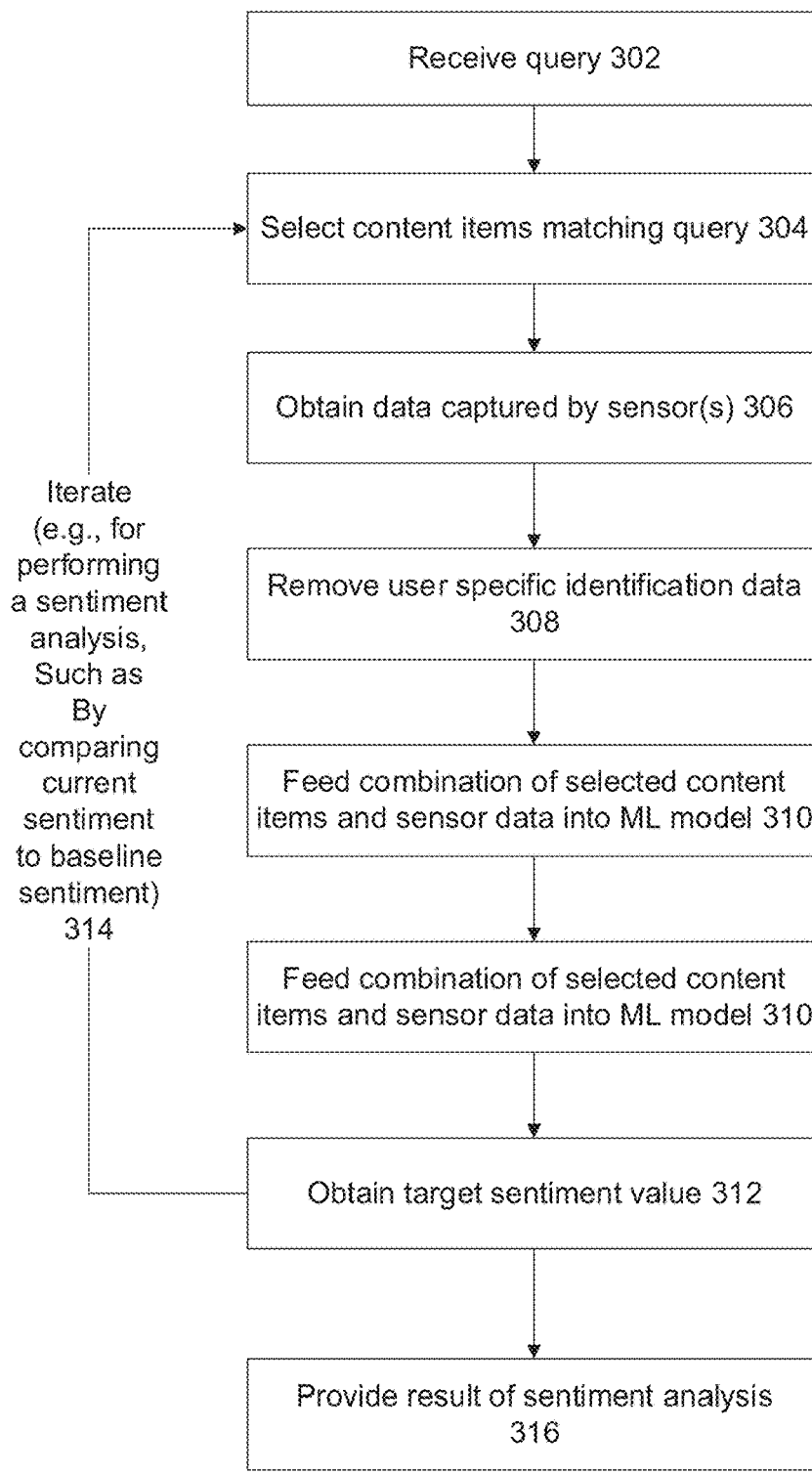
FIG. 3 is a flowchart of a process of computing a sentiment for a specific topic from social network posts and sensor data, in accordance with some embodiments of the present invention.
Figure 4:
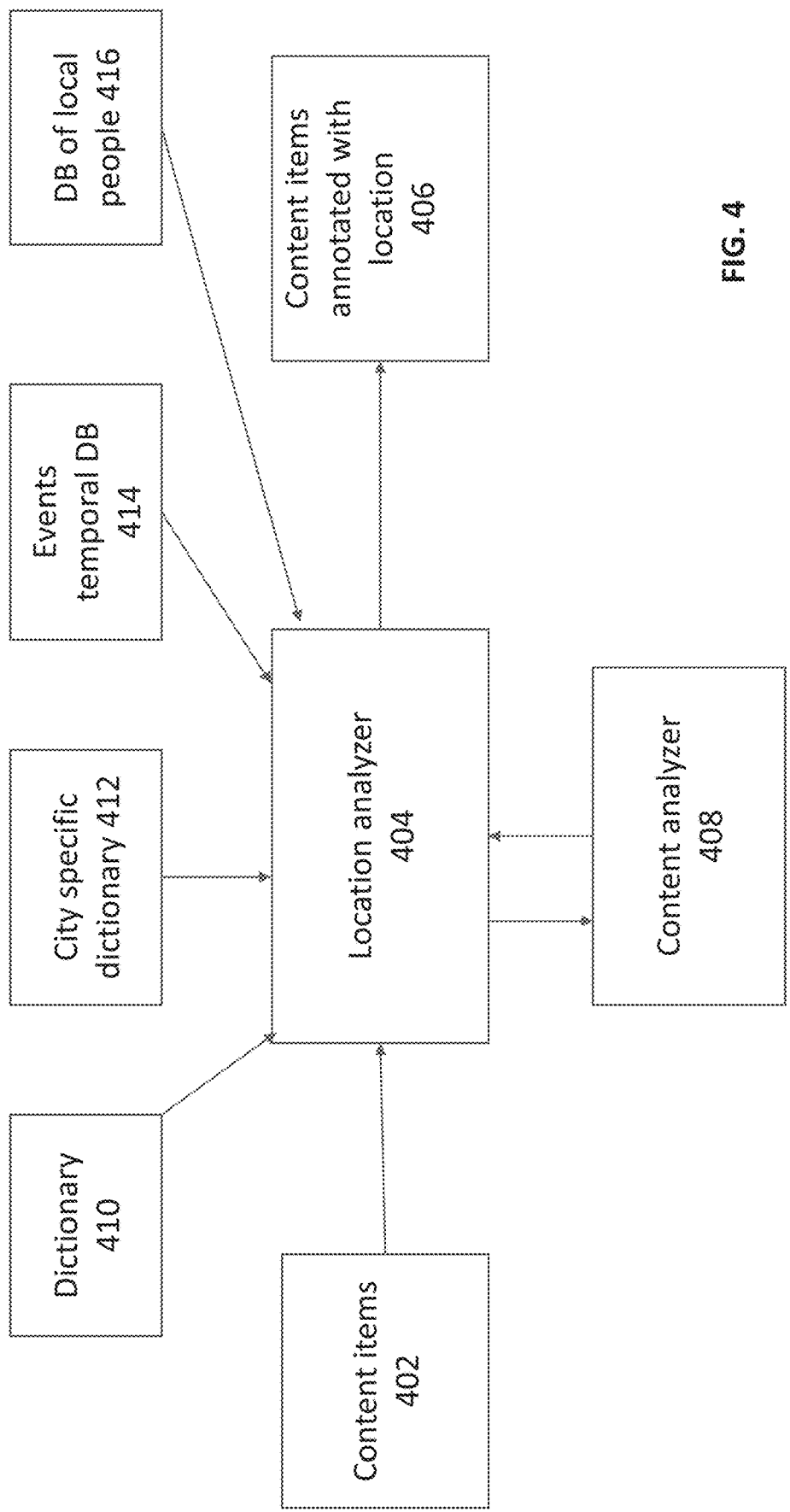
FIG. 4 is a flowchart depicting exemplary dataflow of automatically tagging social network posts with geo-location tags, in accordance with some embodiments of the present invention.
Figure 5:
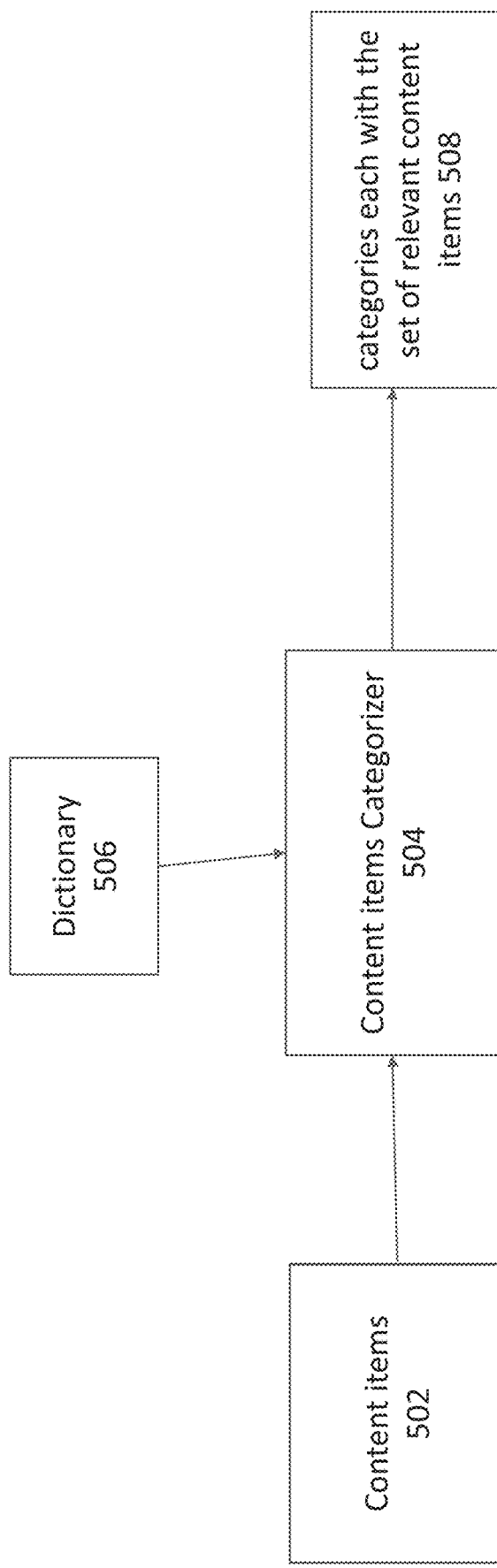
FIG. 5 is a which is a flowchart depicting exemplary dataflow of a process for clustering content items based on an external dictionary, in accordance with some embodiments of the present invention.
Figure 6:
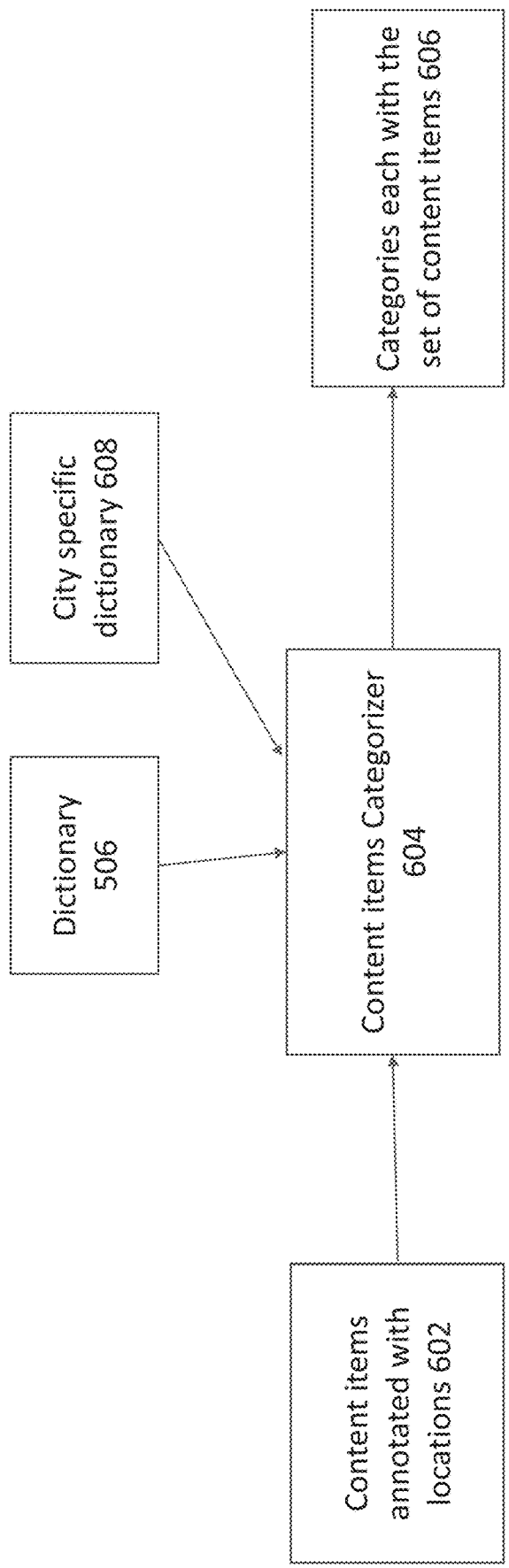
FIG. 6 is a flowchart depicting exemplary dataflow of a process for clustering content items based on a city specific dictionary, in accordance with some embodiments of the present invention.
Figure 7:
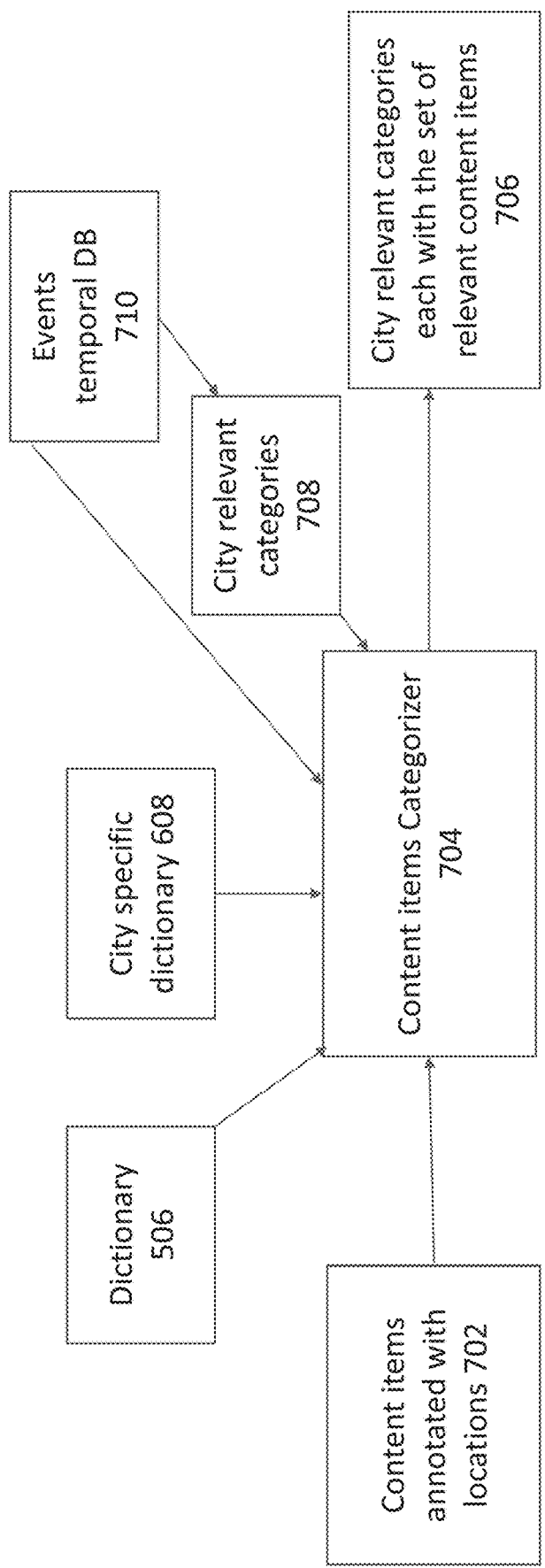
FIG. 7 is a flowchart depicting exemplary dataflow of a process for clustering content items based on events and/or city relevant categories, in accordance with some embodiments of the present invention.
Figure 8:
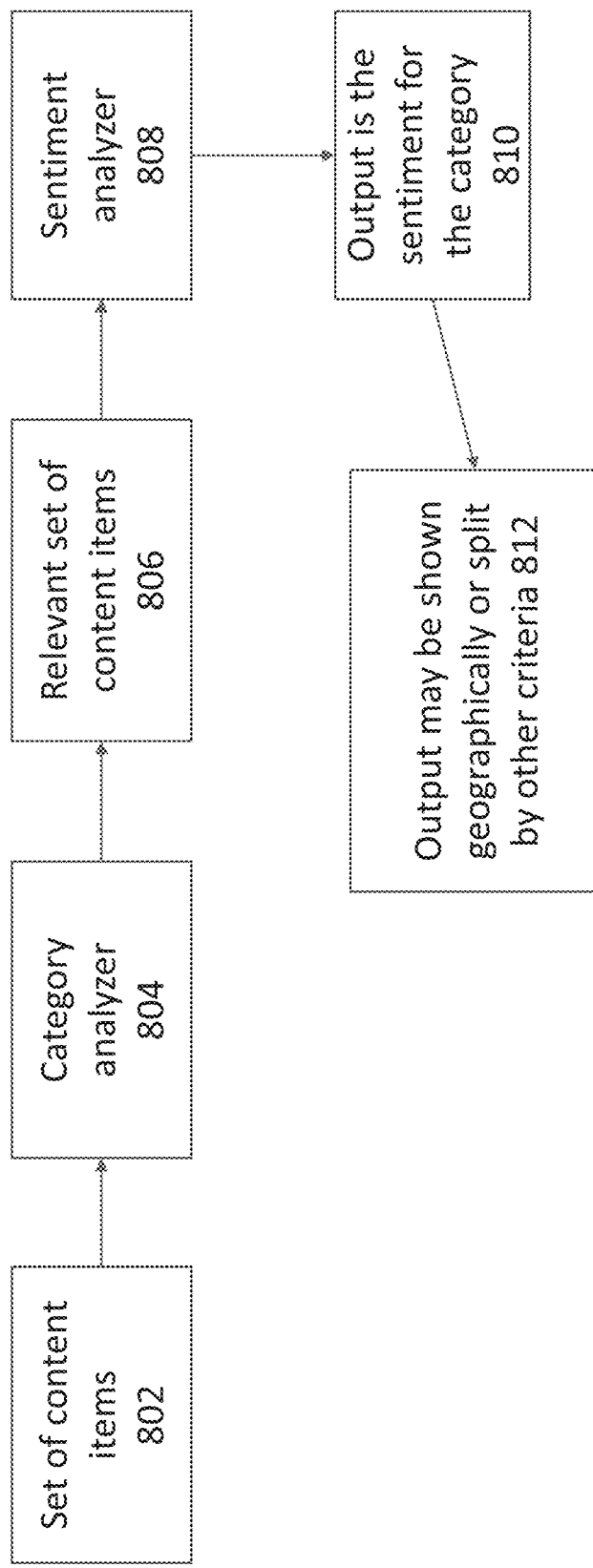
FIG. 8 is a flowchart depicting exemplary dataflow of a process for computing sentiment for a category of content items, in accordance with some embodiments of the present invention.

Reference is now made to FIG. 1, which is a block diagram of components of a system 100 for automatically tagging social network posts with geo-location tags and/or computing a sentiment for a specific topic from social network posts and sensor data, in accordance with some embodiments of the present invention. Reference is also made to FIG. 2A, which is a flowchart of a process of automatically tagging social network posts with geo-location tags, in accordance with some embodiments of the present invention. Reference is also made to FIG. 2B, which is a flowchart of a process of computing a sentiment for a specific topic from the automatically tagged social network posts, in accordance with some embodiments of the present invention. Reference is also made to FIG. 3, which is a flowchart of a process of computing a sentiment for a specific topic from social network posts and sensor data, in accordance with some embodiments of the present invention. Reference is also made to FIG. 4, which is a flowchart depicting exemplary dataflow of automatically tagging social network posts with geo-location tags, in accordance with some embodiments of the present invention. Reference is also made to FIG. 5, which is a flowchart depicting exemplary dataflow of a process for clustering content items based on an external dictionary, in accordance with some embodiments of the present invention. Reference is also made to FIG. 6, which is a flowchart depicting exemplary dataflow of a process for clustering content items based on a city specific dictionary, in accordance with some embodiments of the present invention. Reference is also made to FIG. 7, which is a flowchart depicting exemplary dataflow of a process for clustering content items based on events and/or city relevant categories, in accordance with some embodiments of the present invention. Reference is also made to FIG. 8, which is a flowchart depicting exemplary dataflow of a process for computing sentiment for a category of content items, in accordance with some embodiments of the present invention.

System 100 may implement the acts of the methods described with reference to FIGS. 2A-8, at least by processor(s) 102 of a computing device 104 executing code instructions (e.g., code 106A) stored in a memory 106 (also referred to as a program store), optionally receiving data from sensor(s) 154 (e.g., camera, video camera, audio sensor).

Computing device 104 assigns automatically created geo-location tags 108B to user postings (i.e., user generated content items) to a social network 152A stored on a server(s) 152 and/or performs a sentiment analysis from the user postings optionally with automatically generated geo-tags 108B and/or from data obtained from sensor(s) 154, optionally using ML model(s) 108E trained on training dataset(s) 108F, as described herein.

Social network 152A may be central, residing, for example, on one or more servers 152 that are connected to computing device 104 via a communication network 112. For example, computing device 104 may extract posts by issuing requests over a defined interface (e.g., application programming interface (API), software development kit (SDK) associated with social network 152A. Alternatively or additionally, social network 152A may be hosted by computing device 104. Alternatively or additionally, social network 152A may be decentralized, such as posted user profiles stored by multiple connected computing devices. In such a case, computing device 104 may obtain the user postings, for example, using a crawling code that crawls the social network 152A by following links and/or relationships between user profiles.

Computing device 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 100 based on computing device 104 may be implemented. For example:

Computing device 104 acts as a centralized service provider that provides services to multiple client terminals 110 over network 112, for example, via a client code executing on client terminals 110 that communicate with computing device 104. Each client terminal 110 may be, for example, used by a certain city. For example, an application programming interface (API), software development kit (SDK), functions and/or libraries and/or add-ons added to existing applications executing on client terminal(s), an application for download and execution on the client terminals that communicates with computing device 104, function and/or interface calls to computing device 104, a remote access section executing on a web site hosted by computing device 104 accessed via a web browser executing on the client terminal(s). For example, a client terminal 110 provides a query indicating the topic and/or spatiotemporal event to computing device 104, and optionally provides data captured by sensor(s) 154, and computing device 104 performs a semantic analysis on the identified posts and/or the sensor data for the spatiotemporal event and/or post. The result of the semantic analysis is provided to the respective client terminal 110, for example, for presentation on a display and/or local storage. In another example, computing device 104 centrally generates geo-tags for posts of social network 152A, and optionally clusters the posts with automatically generated geo-tags according to events and/or topics. Client terminals 110 may centrally access the posts with automatically generated geo-tags, and/or access the clusters of topics and/or events. It is noted that the geo-tagged posts may be used in the centralized sentiment analysis performed by computing device 104.

Computing device 104 is implemented as a decentralized service, for example, by providing code 106A for installation on each of multiple client terminals. Each client terminal may then perform its own geotagging of posts to social network 152A, identify and/or clusters posts matching a spatiotemporal event and/or topic, and/or perform the sentiment analysis for the spatiotemporal event and/or topic.

Computing device 104 is integrated with server(s) 152, for example, as a plug-in application, as add-on code, and/or as an interface (e.g., API) to provide added functions to social network 152A. The add-on automatically generates geo-tags for untagged user posts of social network 152A, and/or identifies user posts matching a queried spatiotemporal event and/or topic, and/or performs a sentiment analysis for the spatiotemporal event and/or topic.

Hardware processor(s) 102 of computing device 104 may be implemented, for example, as a central processing unit(s) (CPU), a graphics processing unit(s) (GPU), a field programmable gate array(s) (FPGA), a digital signal processor(s) (DSP), and an application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), a read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. 2A-8 when executed by hardware processor(s) 102.

Computing device 104 may include data storage device(s) 108 for storing data, for example, one or more of: one or more different geographic region mapping datasets 108A, automatically generated geo-tags 108B, a cluster repository 108C that stores posts clustered by topic and/or event, a user mapping dataset 108D, one or more ML models 108E used for computing sentiment, and/or training dataset(s) 108F for training ML model(s) 108E. Data storage device(s) 108 may be implemented as, for example, a memory, a local hard-drive, virtual storage, a removable storage unit, an optical disk, a storage device, and/or as a remote server and/or computing cloud (e.g., accessed using a network connection). Alternatively or additionally, one or more of 108A-F may be stored on data server(s) 156.

Communication network 112 may be implemented as, for example, the internet, a local area network, a virtual network, a wireless network, a cellular network, a local bus, a point to point link (e.g., wired), and/or combinations of the aforementioned.

Computing device 104 may include a data interface 118, optionally a network interface, for connecting to communication network 112, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 include and/or are in communication with one or more physical user interfaces 114 that include a mechanism for user interaction, for example, to enter the spatiotemporal event and view results of the sentiment analysis. Exemplary physical user interfaces 114 include, for example, one or more of, a touchscreen, a display, gesture activation devices, a keyboard, a mouse, and voice activated software using speakers and microphone.

Optionally, computer device 104 accesses data obtained from one or more sensor(s) 154. The data may be obtained over network 112. Exemplary sensor(s) 154 include a video camera and/or still image camera, and/or microphones.

Optionally, computer device 104 accesses topics and/or events, optionally city specific, from one or more data server(s) 156 over network 156.

Referring now back to FIG. 2A, at 202, user generated content items uploaded to a social network from different client devices are accessed. The user generated content items may be, for example, text written by a user, images and/or videos and or audio captured by the user, links to other content items on other network sites posted by the user, and the like. The user generated content items may be, for example, a blog, a persona profile page, tweets, feedback provided by one user on the personal profile page of another user.

The user generated content items may be obtained, for example, by an API of the social network that provides the user generated content items, a crawler application that crawls from one social network page to another using links between pages, and the like.

Optionally, each user generated content item is associated with a timestamp.

Optionally, features 204-210 are iterated per individual user generated content item, for example, per post, per tweet, and per feedback. Features 204-210 may be iterated for user generated content items without associated geo-location tags.

At 204, the respective user generated content item is analyzed to identify a specific geographic region. The specific geographic region may be defined, for example, based on government jurisdiction, and/or based on electoral boundaries. For example, the specific geographic region represents a region that is government by a mayor and/or council, that have decision making abilities and/or control within the region, for example, garbage pickup, bus schedules, police department, and cultural events. For example, the specific geographic region may be a city, a neighborhood within a city, and a county.

One or more processes may be implemented to analyze the respective user generated content post to identify the specific geographic region.

In one implementation, the text and/or image of the respective user generated content post may be run against a dictionary storing a list of geographic regions to identify matches. For example, a user generated content post that says "Chicago" is assumed to be associated with the city Chicago. In yet another example, a thread of posts related to the content item may be analyzed to identify the geographic region. In another example a user generated content post of an image that shows the Manhattan skyline is assumed to be associated with the city New York.

In another implementation, an existing geotag for a geographic region, but not for a specific geographic region may be accessed. For example, when the geotag is for New York City without more specific details, the geographic region is known.

In another implementation, a unique mapping dataset may be used. The unique mapping dataset may map terms unique to a specific geographic region to that geographic region. For example, in a content item discussing a Mayor by name, the specific city which is governed by the mayor is known once the name of the mayor is known. In another example, in a content item discussing a specific ice cream store by name, which only has a single location, once the specific ice cream store is known, the geographic region where the ice cream store is located is found.

In another implementation, a hashtag of the content item is analyzed, for example, using a look-up table, and/or the content of the hashtag is determined. The hashtag may indicate the geographic region.

In another implementation, a user that uploaded the respective user generated content item is identified. For example, a username of the user is found in an open source index of the social network, and/or the name of the user is found according to the social network page on which the content item is posted. The user is mapped to the specific geographic region using a user mapping dataset that maps between user and specific geographic regions.

Exemplary approaches for creating the user mapping dataset include:

- Accessing an address field of a user profile of the user posted on the social network, and creating an entry in the user dataset that maps the user to the geographic region of the address field. It is assumed that the address field is where the user lives, and that the geographic region indicates the city where the user lives. Moreover, it is assumed that the content posted by the user is from somewhere in the city where the user lives.
- Analyzing user generated content items posted by the user to identify a common geographic region, and creating an entry in the user mapping dataset that maps the user to the common geographic region. For example, a user on a trip to Rome posts multiple content items about Rome, indicating that the content items by the user are from somewhere in Rome. For each user there may be a corpus of generated content items. Some of them are related to a specific location. Some of them may have actual location tags. For example, in one post, the user discusses Chicago, or the user discusses a game of the Bulls vs Lakers on the Jan. 1, 2021 (which is in Chicago). The user may talk about the mayor being "John Smith" (the mayor of Chicago). Each association may be weighted. The weights may be aggregated to determine the location of the user. For example, weighted for my mayor is "John Smith" (strong), I traveled to "Chicago" weak.
- Querying a home address database based on the user, for example, an online directory of users, and creating an entry in the user mapping dataset that maps a user to the geographic region corresponding to the home address. It is assumed that the content posted by the user is from somewhere in the city where the user lives.
- Querying a phone dataset of a certain geographic region based on the user, for example, an online phone directory for different cities. When an entry exists in the phone dataset, creating an entry in the user mapping dataset that maps the user to the certain geographic region. For example, for a unique name "John Doe" that appears only in the phone book for Chicago, it is assumed that John Doe lives in Chicago.
- Analyzing content and/or geotags of user generated content items previously posted by the user to identify a geographic region. For example, the user previously posts different content items that mostly have to do with Brooklyn, suggesting that the user lives in Brooklyn.
- Analyzing geographic regions of other users linked to a user profile of the user. For example, users linked to the user profile of the user are most of users living in New York, suggesting that the user also lives in New York.
- Adding weights to one or more of the parameters described above, optionally according to a set of rules, for example, higher weights to relatively more recent parameters, and lower weights to relative more historical parameters based on older data. For example, since people move and retain contact with old friends, a person that moves from a first city to a second city may retain friends from the first city and make new friends in the second city. Assigning greater weights to friends made more recently than to friends made in the past identify the second city as the likely location where the user currently lives.

At 206, a specific geographic region mapping dataset is selected from multiple geographic region mapping datasets according to the specific geographic region identified for the respective user generated content post.

Using multiple different geographic region mapping datasets, i.e., a respective mapping dataset per unique geographic region, improves performance of a computing device that automatically computes geo-tags, by faster mapping. Mapping by the specific geographic region mapping dataset is faster and/or more accurate than other mapping implementations, for example, using a large database for multiple (e.g., all) geographic regions. For example, for 10 million content items, running the 10 milling content items through the specific geographical region dataset is more computationally efficient than running the 10 million content items through a more generic mapping approach that maps to different geographic regions. Moreover, each specific geographic region mapping dataset may be executed by a different computing device, for example, a server of each city executes the specific geographic region mapping dataset for its own city, which improves performance in comparison to a central server that maps to multiple different cities.

An implementation of having multiple different geographic region mapping datasets enables allocating individual respective geographic region mapping datasets to different end user client terminals, for geo-tagging of content items for respective geographic regions. For example, the municipality of a first city uses its own geographic region mapping dataset to geo-tag content items relevant to the first city, and the municipality of a second city uses its own other geographic region mapping dataset to geo-tag content items relevant to the second city.

One or more exemplar approaches for computing the geographic specific dataset are now described.

In one example, generic terms may be identified using one or more approaches. For example, parsing content items using natural language processing (NLP) based approaches to obtain a set of terms. Each term may be fed into a search engine that searches, for example, the internet and/or content posted to social network(s). The search results may be analyzed to determine whether the results are for a single geographic location (in which case the term is identified as a unique term that is associated with a specific geographic location, as described herein), or for multiple locations. The search results may be analyzed by matching terms to a set of geographic locations (e.g., list of cities) and/or by checking for geographic labels assigned to the search results. When multiple results for multiple locations are found, each result is analyzed to extract terms that were used to obtain the result. The extracted terms are inserted into the geographic specific dataset for the corresponding identified geographic location. For example, the word 'library' is identified as a generic term, since when 'library' is searched, many results are found, for example, main central library, university library, and a private library, each in different cities. The different specific libraries are added to the geographic specific databases corresponding to their locations.

In another example, an initial set of content items with existing geotags are found. The content items may be clustered, where each cluster may represent a generic term. The clustering may be performed, for example, by converting terms into vectors, and clustering the vectors in a multi-dimensional space. The center of each cluster corresponds to the generic term of that cluster. Entries into specific geographical datasets are extracted from content item members of the cluster. Specific terms corresponding to each generic term are inserted into geographical specific datasets corresponding to the locations in the geotags. For example, main central library, university library, and a private library, are specific terms in the cluster with generic term 'library'. Each of main central library, university library, and a private library, are specific terms added as entries into respective geographic specific datasets according to the geotag in which the respective specific term is found. Additional entries may be found by feeding the generic term into a search engine, and analyzing the search results, as described above. For example, content items are clustered into a cluster of a certain franchise restaurant with multiple braches at different locations. Each content item of the cluster mentions the same restaurant, with a different geotag. The same generic restaurant name is entered as an entry in all the geographic specific datasets according to the different geotags. When all geotags of the cluster are the same, the term is considered as unique term specific to a specific location, as described herein.

The geographic specific mapping dataset may be implemented, for example, as a ML model, for example, statistical classifiers, neural networks of various architectures (e.g., fully connected, deep, encoder-decoder, recurrent), support vector machines (SVM), logistic regression, k-nearest neighbor, decision trees, boosting, random forest, and the like. Machine learning models may be trained using supervised approaches and/or unsupervised approaches.

At 208, one or more generic terms of the respective user generated content post are mapped by the specific geographic region mapping dataset to a specific geographic location within the specific geographic region. The specific geographic location indicates a specific location within the specific geographic region. For example, when the specific geographic region is a city, the specific geographic region is, for example, an address within the city (e.g., 234 Main Street), a defined building within the city which has a known unique location (e.g., City Hall), global positioning coordinates within the city, and a defined geographic zone within the city which has a known unique location (e.g., boardwalk, central park).

The generic terms may be phrases. For example, the generic term "fourth street" (downtown) may be mapped to a specific location in Manhattan when using the Manhattan specific mapping dataset, and the same genetic term "fourth street" may be mapped to a different location in Berkeley when using the Berkeley specific mapping dataset.

Optionally, the respective user generated content post is analyzed to identify one or more generic terms. The generic terms may be found, for example, by running terms in the respective user generated content post through a generic terms dictionary to find matches. The generic terms dictionary may be created for the specific geographic region mapping dataset, optionally included therein according to the generic terms mapped by the specific geographic region mapping dataset. Alternatively, the respective user generated content post is not necessarily first analyzed to identify the generic terms. Rather, the terms of the respective user generated content post may be fed into the mapping dataset. Terms that are mapped are considered generic terms, while terms that are not mapped by the mapping dataset are ignored.

The same generic term, when used with different geographic region mapping datasets, is mapped to different geographic locations within different geographic regions corresponding to the different geographic region mapping datasets.

Examples of generic terms include: a same street name occurring in multiple cities (e.g., main street, $1^{st}$ street), a same building type/function occurring in multiple cities (e.g., hospital, city hall), a same neighborhood type occurring in multiple cities, a branch of a franchise in multiple cities, and a same geographic feature (e.g., city center, boardwalk, the harbor) and/or topographical feature (e.g., the pond) occurring in multiple cities.

Optionally, an analysis of mapping of multiple generic terms of the respective user generated content post is performed. When all or a set of generic terms (e.g., above threshold) are mapped to the same specific geographic location, the probability that the specific geographic location is accurate may be determined to be high. For example, when a generic street (e.g., main street), a generic building (e.g., library), and a generic geographical feature (e.g., park), all mentioned in the content item, all map to the same specific address using the same specific geographic region mapping dataset, the probability that the specific address is accurate may be determined to be high. Alternatively or additionally, the analysis may determine when the identified specific geographic location is likely an error. For example, when the generic street, the generic building, and the generic geographical feature map to different locations in the city, the mapped geographic locations are likely an error.

Optionally, when multiple generic terms of the respective user generated content post are each potentially mapped to multiple different geographical locations within the geographic region, the specific geographical location may be found as the common geographical location of the multiple mappings, for example, a union operation on multiple sets each of multiple geographical locations. For example, for a content item that indicates a generic term of branch of a restaurant franchise that has multiple locations throughout the city, it is unknown which specific restaurant location is being discussed. When the content item further mentioned the generic term "Downtown", the location of the restaurant is now known, it is the restaurant located in the downtown region of the city.

Optionally, the mapping dataset is dynamically updated with new data obtained by the mappings. For example, based on the above example of identifying the location of the downtown restaurant based on the generic terms downtown and the restaurant franchise, the mapping dataset may be updated with the mapping between a combination of generic terms downtown and the restaurant franchise, and the identified location.

Optionally, the mapping dataset may be updated to store data linked to specific users. For example, once the location of the generic term restaurant has been found as in the example above, for a specific user "John Doe", another content item posted by John Doe that discusses the generic term restaurant may be mapped to the specific previously identified restraint location, even when the new content item does not indicate additional information (e.g., generic terms) such as downtown that may be used to identify the location.

Optionally, the mapping dataset may be updated to store time associated locations of specific users. Once an initial content item of a specific user is mapped to a specific location, additional content items having timestamps close in time to the initial content item may be mapped to the same specific location, based on the assumption that the user has not moved quickly from that specific location.

Optionally, the mapping of the generic term(s) of the respective user generated content post is performed in combination with a timestamp of the respective content item. Timing linked to generic term(s) may be stored by a time dataset associated with the specific geographic region mapping dataset. The time dataset may be accessed (e.g., in real time) from other external datasets. The time dataset links between generic terms and time. For example, the time dataset may store a history of locations of fire trucks of the specific geographical location, i.e., where each fire truck was located at historical dates and/or times. For a content item that mentions the generic term "fire truck", and the timestamp of the content item, the fire truck at a specific time/date may be mapped to the specific location where the fire truck was at the specific time/date of the timestamp according to the historical location of fire trucks. In another example, for a content item discussing how the ice cream place just closed, the generic term "ice cream place" and the timestamp may be mapped using opening hours of ice cream parlors in the city, to identify the specific location of the ice cream place being discussed when there is a unique ice cream parlor that closes at a time matching (within a tolerance range) the time of the timestamp. In yet another example, for a content item discussing how I just missed bus number 18, the generic term "bus number 18" and he timestamp may be mapped using bus routes of the city to identify where bus number 18 is located at the time corresponding to the timestamp, to determine the specific location.

At 210, the respective user generated content item is tagged with a geo-location tag of the specific geographic location within the specific geographic region. The specific geographic location is the outcome mapping of the specific geographic region mapping dataset, as described with reference to feature 208 of FIG. 2A.

Referring now back to FIG. 4, features described with reference to FIG. 4 may correspond to, and/or be integrated with, and/or be replaced with, one or more features described with reference to FIG. 2A. Each respective content item 402 is analyzed by a location analyzer 404 to identify a specific geographical location for the respective content item. A geo-tag indicating the specific geographical location is automatically generated and assigned to the content item, for generating content item annotated with location 406. Location analyzer 404 may access a content analyzer 408, for example, for identifying a geographic region, e.g., city, for the content item. The identified city may be used for selecting a city specific dictionary 412 used to map generic terms in the content item to specific geographical locations in the city, e.g., a geographic specific mapping dataset. A dictionary 410 may be used, for example, for mapping unique terms in the content item to specific geographical locations, for example, "Statue of Liberty" of which there is a single defined location. An events temporal database 414 may be used for mapping combinations of a timestamp and generic term to a specific geographical location according to predefined temporal relationships, for example, bus schedules, planned events, and routes of police patrol cars. A database of local people 416 living in the city may be used to identify the city and/or identify specific locations in the city, for example, where the local person lives, and/or based on an earlier content item by the same person for which the location has been found.

Referring now back to FIG. 2A, optionally, the process terminates after feature 210, providing automatically generated geo-location tags for user generated content items without geo-location tags. Alternatively, the process continues as described with reference to FIG. 2B, using the automatically generated geo-location tags created as described with reference to FIG. 2A.

Referring now back to FIG. 2B, optionally, at 212A, a query indicating a specific spatiotemporal event defined for an event time interval in an event geographic location within the specific geographic region may be received. Optionally, the query is for a same type of the specific spatiotemporal event that also occurs as another spatiotemporal event in another geographic region and/or another geographic location and/or at another time interval. For example, the query is for a fundraising concert held on June 10, at central park, Manhattan, which is different than another fundraising concert held on the same day in Chicago, and different than another fundraising concert at central park, Manhattan, on July 29.

Examples of specific spatiotemporal events include: a parade, a farmer's market, a bus route, police presence schedule, open air performances, sport event, public address, garbage collection, and malfunctioning street lights.

Optionally, the specific geographic location of the specific spatiotemporal event varies within the specific geographic region over the specific time interval. For example, a parade having a time varying route through different streets of the city.

The query indicating the specific spatiotemporal event may be obtained by accessing a database of spatiotemporal events that are scheduled to occur and/or that have already occurred in a specific geographic region, for example, a database of planned city cultural events. Alternatively or additionally, the query may be received, for example, as a manual user entry that selects the time interval and the specific geographic location. Alternatively or additionally, the query is created by first clustering user generated content items tagged with geo-location tags denoting an event according to an analysis of terms in the respective user generated content item. For example, all user generated content items discussing the fundraising event are clustered together into one cluster, and all user generated content items discussing the marathon are clustered into another cluster. The clustering may further be according to geo-locations defined by the geo-location tags of the user generated content items and/or time intervals defined by timestamps of the user generated content items. Each cluster may represent a respective spatiotemporal event of the query, where the spatiotemporal event corresponds to the event of the cluster, the specific geographic location corresponds to the common location of the geo-location tags of members of the cluster, and/or the time interval of the spatiotemporal event corresponds to the time stamps of members of the cluster.

At 214A, user generated content items having geo-location tags matching the event geographic location of the spatiotemporal event of the query and timestamps matching the event time interval of the spatiotemporal event of the query are selected. When clusters are created, one cluster may be selected according to the selected spatiotemporal event, and user generated content items of the selected cluster are accessed.

Alternatively or additionally to 212A, at 212B, the geo-tagged user generated content items may be clustered into geographic clusters each denoting a respective geographic region, for example, per city, per neighborhood, and the like.

Optionally, the geographic clusters are guided by a geographic specific clustering dataset, which may indicate which specific geographic locations of the geographic region are in proximity to one another. For example, the geographic specific clustering dataset may indicate that for a specific city, main street and avenue road are next to each other and content items at these locations may be clustered together. In another example, the geographic specific clustering dataset may indicate that for a specific city, the playground and the pond are actually at the same specific park, and content items at any of these locations may be clustered together. The geographic specific clustering dataset may be created, for example, by looking up locations on a map to identify coordinates, for example, longitude and latitude values. When a difference between longitudinal and latitude coordinates is less than a threshold (e.g., 100 meters, 250 meters) the two locations may be considered to be the same, and when the different is within a range (e.g., 250 meters-1000 meters, or 300-500 meters) the two locations may be considered to be in proximity. The geographic specific clustering dataset may be implemented, for example, as a graph, where each node is a location, and connected nodes are considered to be close to one another. Two locations are the same when they are in the same node.

Geo-tagged user generated content items of the (e.g., each) respective geographic region are further sub-clustered into topic clusters each denoting a respective topic. The topic clusters may be for topics that are common for each of the geographic clusters, for example, common issues that arise in each of the cities, for example, noise levels, parking issues, cultural events, and police presence.

Topic clustering may be performed, for example, using a general dictionary. For example, a cat is a type of pet, and a content item discussing cats is included in a topic cluster on pets. Topic clustering may be based on word similarity, for example, using word vectors and/or word embeddings, and/or based on taxonomy. In one example, a cluster of a topic of side-walk is created, which includes issues related to side-walks, such as drainage, street cleaning, noise, air quality, police, and busses.

Alternatively or additionally, the geo-tagged user generated content items are further clustered into respective geographic locations. The clustering into geographic locations may be an additional clustering process before and/or after the other clustering processes, for example, clustering is first per geographic region, then per geographic location, and then per topic, or first per geographic region, then per topic, and then per geographic location. Alternatively, the clustering is an integrated clustering process integrated with other clustering processes, for example, clustering is per a combination of a certain topic and a certain geographic location.

The topics may be common to all the geographic regions, for example, first content items are clustered per city, and then for each city, content items of that city are further clustered into the topics of: police, bus schedule, garbage removal, parking, and cultural events. Alternatively or additionally, topics may be defined according to the content items of each respective cluster.

The topics clusters may be according to topics identified according to an analysis of topics raised by residents of a respective geographic region that provide queries to a central query handling center, for example, calls and/or messages to a city support center that handles resident complaints and inquiries. The resident complains and/or inquiries may be organized per topic, for example, parking, garbage, noise, and cultural events.

The topics clusters may be according to data stored in other accessible databases, optionally specific per geographic region, for example, city specific, or an output of another ML model (a topic classifier). For example, resident complaints about noise, schedule of police patrols, and public transportation routes. Clusters may be created, for example, for police presence in a specific geographical location, for a specific police car, and for specific complaints.

At 214B, a specific topic cluster corresponding to a specific topic is selected, for example, manually by a user and/or automatically by code. The specific topic may be received as a query, and/or automatically obtained, for example, iteratively obtained from a list of topics.

At 216, user specific identifying data may be excluded from the user generated content items in the selected topic cluster and/or in the selected spatiotemporal event cluster. The excluding is performed such that a further analysis (e.g., sentiment analysis described with reference to 218) is performed as a summary without data that identifies specific users. The exclusion of user specific identifying data may be excluded in other stages of the process described herein.

At 218, a sentiment analysis may be performed on the user generated content items, of the selected topic cluster and/or the selected spatiotemporal event cluster, and/or having geo-location tags and timestamps matching to the spatiotemporal event.

The sentiment analysis provides a sentiment summary for the selected topic in the geographic region, and/or for the selected spatiotemporal event. For example, how happy are people with garbage removal in the city? In another example, did people enjoy the concert held yesterday in the main park of the city?

The sentiment analysis may be performed, for example, using a combination of sensor data and user generated content items, and/or based on comparison with a sentiment baseline, as described with reference to FIG. 3.

Alternatively, other approaches of sentiment analysis may be used, for example, based only on the user generated content items.

At 220, the results of the sentiment analysis may be provided, for example, presented on a display of a client terminal, stored in a data storage device, forwarded to a remote computing device, and/or provided as input into another process for further processing.

Referring now back to FIG. 5, content items 502 may be categorized by a content items categorizer 504, optionally by clustering the content items based on an external dictionary 506, optionally based on an analysis of content of the content items. Dictionary 506 may be, for example, a common dictionary that stores topics which are of interest to several cities, for example, parking, performance of mayor, noise complaints, and garbage removal. Clusters of category topics each with a respective set of content items 508 are generated.

Referring now back to FIG. 6, content items annotated with locations 602 are generated, for example, as described with reference to FIG. 2A. The content items with locations 602 are categorized, optionally clustered, by a content item categorizer 604 into categories 606. Content item categorizer 604 may cluster the content items using dictionary 506 (e.g., as described with reference to FIG. 5), and/or cluster the content items using city specific dictionary 608 which may indicate which content items to cluster together, for example, by identifying which locations are close to one another, for example, that a specific park and a specific pond are actually at the same specific nature reserve and therefore may be clustered together. In another example, that main street and avenue road are next to one another and may be clustered together.

Referring now back to FIG. 7, content items annotated with locations 702 are generated, for example, as described with reference to FIG. 2A. The content items with locations 702 are categorized, optionally clustered, by a content item categorizer 704 into city relevant categories each with the set of relevant content items 707. Content item categorizer 704 may cluster the content items using dictionary 506 (e.g., as described with reference to FIG. 5), and/or cluster the content items using city specific dictionary 608 (e.g., as described with reference to FIG. 6), and/or using a database of city relevant categories 708 and/or events temporal database 710. Database of city relevant categories 708 which stores topics of interest to one or more cities, and/or topics of interest to the specific city, for example, created by analyzing topics of residents submitted to a central city information and/or complaints department, such as garbage collection, parking issues, and snow removal. Events temporal database 710 may store events occurring in the specific city, for example, planned cultural events, concerts, and parades. Database of city relevant categories 708 and/or events temporal database 710 enable clustering content items into topics and/or events which are specific to the city and/or which may not be apparent from the content items themselves, for example, when the content item does not explicitly state the topic and/or event, but occurs at the same time and/or at the same location as the topic and/or event.

Referring now back to FIG. 3, the features described with reference to FIG. 3 may be implemented as a standalone process (e.g., an alternative to the process described with reference to FIG. 2B), and/or may be integrated with the features described with reference to FIG. 2B as an integrated process. For example, one or more features described with reference to FIG. 2B may be combined and/or replaced with the features described with reference to FIG. 3.

At 302, a query is received. The query may indicate a specific topic for a specific geographic region, for example, garbage pickup in a specific city, and/or a parade held in a neighborhood. The specific topic may be for a specific geographic location in the specific geographic region, for example, garbage pickup along $4^{th}$ street in the specific city. The query may be for a specific spatiotemporal event defined for a specific time interval in a specific geographic location in the specific geographic region, for example, or a concert held on the $4^{th}$ of July in a specific park in a specific city.

The query may be, for example, manually entered by a user, and/or automatically sequentially extracted from a dataset, i.e., multiple queries are obtained from data stored in the dataset. For example, from a list of cultural events planned for, or done by in the past, by the city, a respective query is generated corresponding to each cultural event.

At 304, a subset of user generated content items uploaded to a social network (e.g., from different client terminals), discussing the topic and/or the spatiotemporal event and having geo-location tags matching the specific geographic region and/or matching the specific geographic location (according to the content of the query), are selected.

The subset of user generated content items may be obtained, for example from the clusters described with reference to 212A and/or 212B of FIG. 2B.

At 306, data captured by one or more sensors depicting the specific geographic region, optionally the specific geographic location (when included in the query) is extracted. The data may be extracted from the sensor(s) at times matching the time interval of the spatiotemporal event (when included in the query).

Examples of sensor(s) include: a camera capturing a video, a still camera capturing individual images, an infrared camera capturing infrared images, and audio sensor (e.g., microphone) capturing sounds. Such cameras and/or microphones may be located in public places for continuously collecting data, for example, for security purposes. Images of $4^{th}$ street of a specific city at 10 AM on July $4^{th}$ may be captured, corresponding to the time and location of a parade.

Optionally, the data is a video, of multiple frames, for example, depicting one or more people walking down the street. People's sentiments may be estimated from a gait analysis of the video. For example, an amount of energy expended by the person may be estimated from the video to determine emotions, indicating sentiment. For example, a person walking slowly and crouched over may indicate melancholy. A person running may indicate stress. A person walking briskly and upright may indicate that the person is content.

Optionally, the data is an audio recording, for example, of street sounds. The sounds may be analyzed to determine public emotions on the street, for example, quiet may indicate tranquility, honks and sirens may indicate stress, soft sounds of cars driving and people walking may indicate a regular emotion, sharp movement of cars and/or people (e.g., zig-zag and/or side to side motion, rapid acceleration and/or deceleration) may indicate energy and stress, and music may indicate happiness.

At 308, user specific identification data, for example, names of users, pictures of users, and other data that may be used to identify specific people, may be removed from the content items and/or the data captured by sensor(s). The user specific identification may be removed to protect privacy of individuals, for presenting an aggregated summary of the data as a whole, such as public opinion, without referring to individuals. The user specific identification data may be removed before and/or after input into the ML model.

At 310, a combination of the subset of the user generated content items and the extracted data captured by the sensor(s) is inputted into a machine learning (ML) model. The combination that is fed into the ML model may be raw content items and raw sensor data. The content items and extracted data may be simultaneously inputted into the ML model, for example, into a two headed ML model where one head receives the content items (e.g., text) and the other head receives the data (e.g., video and/or audio files). Multiple content items and videos and/or audio may be inputted, optionally simultaneously.

The content items and/or extracted data may be formatted, for example, placed into a feature vector, and the feature vector is inputted into the ML model.

Optionally, the content items and/or extracted data are pre-processed, for example, for extraction of features, and the features may be inputted into the ML model. For example, the extracted data are first fed into a sensor data ML model to obtain an outcome of a sensor data sentiment and/or to obtain sensor features and/or the subset of user generated content items are first fed into a content item ML model to obtain an outcome of a content item sentiment and/or to obtain sensor features, and the outcome of the sensor data ML model and/or outcome of the content item ML model are fed into a main ML model. In another example, the outcome of the sensor data ML model is fed in combination with the user generated content into the main ML model. In yet another example, the outcome of the content item ML model is fed in combination with the extracted data into the main ML model. The outcomes of the sensor ML model and/or content item ML model that are fed into the main ML model may be embeddings extracted from hidden neural layers of a neural network implementation, for example, as embedded feature vectors.

The ML model may be trained on a training dataset of a combination of user generated content items and data captured by the sensor(s), and labelled with an indication of a sentiment value. The sentiment value may be, for example, a category (e.g., happy, upset, satisfactory, unsatisfactory), a numerical value (e.g., on a scale of 1-10, where 1 is very sad or poor, and 10 is very happy or excellent), or other indications. Other ML model implementations are trained according to relevant training datasets. For example, the sensor data ML model may be trained on sample sensor data labeled with sentiment values, the content item ML model may be trained on content items labelled with sentiment values, and/or the main ML model may be trained on combinations of outcomes of the sensor data ML model and/or content item ML model, embeddings extracted from hidden layers of sensor data neural network ML models and/or content item neural network ML models, and raw sensor data and/or raw content item data.

Examples of ML models include: statistical classifiers, neural networks of various architectures (e.g., fully connected, deep, encoder-decoder, recurrent), support vector machines (SVM), logistic regression, k-nearest neighbor, decision trees, boosting, random forest, and the like. Machine learning models may be trained using supervised approaches and/or unsupervised approaches.

Exemplary training data for the ML model may be found, for example, for events on which there are very convincing results from the social media, objective results, and/or from surveys. Events with objective results may be used to train the ML model. For example, for a sports game, it may be assumed that when the home team wins, the local fans are happy, and the visitor fans are not. After the game, when the home team has won, content items from local fans (e.g., identified by user location, who they cheer for, likes of the team, etc.) and videos of local fans (e.g., inside and/or outside the stadium, identified as people being happy and/or wearing shirts and/or hats of the home team) are labelled with a ground truth indication of positive sentiment (e.g., happy). Content items from visitor fans (e.g., complaining about the loss, likes of the visitor team, pictures of the visitor team) and videos and/or audio recordings of the visitor fans (e.g., inside and/or outside the stadium, and/or watching at the city when the visitor team is from, identified as being upset and/or wearing shirts and/or hats of the visitor team) are labeled with a ground truth indication of negative sentiment (e.g., upset, not happy). In another example, after an election, the group whose candidate won is assumed to be happy, and the group whose candidate lost is assumed to be upset. Content items and videos and/or audio recordings of the two groups are obtained, and labelled with the corresponding observed sentiment, for generating a training dataset for training the ML model.

At 312, a target sentiment value is for the specific topic and/or the specific spatiotemporal event is obtained as an outcome of the ML model. The target sentiment value may be, for example, a category, a numerical value, or other indications.

At 314, one or more features described with reference to 304-312 may be iterated. The iterations may be performed, for example, sequentially and/or in parallel. The iterations may be for performing a sentiment analysis. The feature may be repeated at different times and/or for different locations, for example, to measure the sentiment analysis over time (e.g., rate of return to baseline) and/or to compare the sentiment analysis between two regions and/or groups (e.g., one serving as a baseline).

The sentiment analysis may help place the target sentiment value in context. For example, the meaning of a value of 5.3 on a happiness scale may be difficult to conceptualize. Is the value of 5.3 god or bad? Who has a value of 5.3? The people participating in the event? The people next to the event but not participating? Comparison of the target value relative to a baseline may improve understanding. For example, people may be happier when the target sentiment value is greater than the baseline.

For example, the sentiment analysis may be based on the iterations, by computing a baseline of the sentiment value, and measuring another sentiment value relative to the baseline, referred to below as a current sentiment value. The iterations may be performed for tracking changes of the sentiment value, for example, over time. The comparison relative to baseline may determine, for example, whether the current sentiment increased, decreased, or remained about the same relative to baseline. The rate of change in sentiment relative to baseline may be analyzed, for example, to determine the impact of the spatiotemporal event and/or topic.

The sentiment baseline may be obtained as an outcome of inputting into the ML model, a baseline set of user generated content items having a timestamp external to the specific time interval and/or time intervals corresponding to the topic and/or geographic location external to the specific geographic location of the specific spatiotemporal event and/or geographic location external to the geographic locations corresponding to the topic. The baseline set of user generated content items may be for the same specific geographic region. The current sentiment value for the specific spatiotemporal event and/or the topic is compared relative to the sentiment baseline.

The baseline may be for a different time with same location as the current sentiment. For example, comparing the sentiment for the same location when the event did not happen (e.g., before the time of the event) to when the event did happen (e.g., during the event, after the event). For example, for a one-time event held on Monday, the sentiment for the same location during a previous Monday is compared to the sentiment for the Monday on which the event is held. If the previous sentiment was 3.4 before the event, and on the day of the event the sentiment is 5.3, this may be an indication people are happier due to the event. If the previous sentiment was 7.9 before the event, and on the day of the event the sentiment is 5.3, this may be an indication people became less happy due to the event.

The sentiment baseline may be obtained as an outcome of inputting into the ML model, the baseline user generated content items having a timestamp external to the specific time interval of the specific spatiotemporal event and/or timestamps external to the time corresponding to the topic, and geographic location matching the specific geographic location of the specific spatiotemporal event and/or matching the location(s) corresponding to the topic. The current sentiment value for the specific spatiotemporal event and/or topic is compared relative to the sentiment baseline.

The baseline may be for a same time with different location then the current sentiment. For example, for $1^{st}$ street and $9^{th}$ street which are next to each other in a specific city, when the event occurs on $1^{st}$ street but does not occur on $9^{th}$ street, $9^{th}$ street may be used as a baseline to evaluate the sentiment impact of the event held on $1^{st}$ street.

The sentiment baseline may be obtained as an outcome of inputting into the ML model, the baseline user generated content items having a timestamp matching the specific time interval of the specific spatiotemporal event and/or matching time(s) corresponding to the topic, and geographic location external to the specific geographic location of the specific spatiotemporal event and/or external to location(s) corresponding to the topic. The current sentiment value for the specific spatiotemporal event and/or topic is compared relative to the sentiment baseline.

The baseline may be for a different location with same sentiment history as the current location of the event and/or topic. Referring back to the example using $1^{st}$ street and $9^{th}$ street above, $9^{th}$ street may be selected for a baseline relative to $1^{st}$ street when a history of sentiment scores over time between $1^{st}$ street and $9^{th}$ street is similar. The historical sentiment similarity indicates that people on $1^{st}$ street and people on $9^{th}$ street, are expected to have similar sentiments in the future. A deviation between the sentiments may be attributed to the event.

A first historical sentiment profile of one or more sentiment values may be computed over a historical time interval, for the geographic location external to the geographic region of the specific spatiotemporal event and/or for location(s) external to the location(s) corresponding to the topic. The first historical sentiment profile may be selected when a distribution of the first historical sentiment profile is similar to a second historical sentiment profile of multiple sentiment values computed over the historical time interval for the geographic region of the specific spatiotemporal event and/or the topic. The first historical sentiment profile represents the baseline. The second historical sentiment profile represents the current sentiment. The similar distribution between the first and second historical sentiment profiles indicates that the baseline corresponds to the current sentiment, and may serve as an accurate baseline.

The baseline may be for a same time and location as the event, but not part of the event. For example, for people in a park participating in a town fair, and people in the park that are not participating in the town fair. Comparing the two groups, which are expected to have similar sentiments since they are at the same place at the same time, may indicate the sentiment impact of the event on those that are participating and those that are not participating. For example, for those not participating, are they upset by the presence of the fair while they are enjoying the park, or are they happy that the fair is enhancing their vision of the park?

The sentiment baseline may be obtained as an outcome of inputting into the ML model, baseline user generated content items indicating content external to the specific spatiotemporal event and having a timestamp matching the specific time interval of the specific spatiotemporal event and/or geographic location matching the specific geographic location of the specific spatiotemporal event. The sentiment value for the specific spatiotemporal event is compared relative to the sentiment baseline.

Alternatively or additionally to using a baseline, two or more sentiment values computed for two or more groups of user types are compared to each another. Two groups of people may be compared to each other, to determine whether they have similar sentiments towards the event/topic the same, or different sentiments towards the event/topic. Optionally, the subset of user generated content items are clustered into at least two clusters according to a respective user type. Examples of user types include: fan of a certain spot club where two or more sport clubs are compared to each other, affiliation with a certain political party where different political parties are compared to each other, and home city where different cities are compared to each other. For each of the at least two clusters, a respective cluster sentiment value is obtained as an outcome of inputting user generated content, items of the respective cluster into the ML model. Multiple cluster sentiment values are computed for the multiple clusters. The multiple cluster sentiment values may be analyzed by evaluating a first cluster sentiment value relative to a second cluster sentiment value. For example, which fans of which sport club were most impacted by the event?

Alternatively or additionally, the current sentiment value is compared to a long term baseline sentiment baseline, for the same people. Since the same people may be predicted to continue along their historical sentiment baseline, changes from the sentiment baseline may be attributed to the event/topic. Multiple users that posted the user generated content items are identified, for example, according to user name, profile of user where the content was posted, and the like. The sentiment baseline may be obtained as an outcome of inputting into the ML model, a baseline of user generated content items including historical user generated content posted by the identified users prior to the specific spatiotemporal event. The historical user generated content items may match the specific geographic region of the specific spatiotemporal event prior to the specific spatiotemporal event. The sentiment value for the specific spatiotemporal event may be compared relative to the sentiment baseline.

Optionally, an increase in sentiment for the specific spatiotemporal event relative to the sentiment baseline is computed. The increase indicates a sentiment impact of the event, e.g., the event made people happier. The larger the increase, the larger the positive sentiment impact. Alternatively or additionally, a descent rate from the increase in sentiment for the specific spatiotemporal event until the sentiment baseline is computed. The descent rate may be computed by iteratively computing the sentiment using corresponding sequentially posted user generated content items. The descent rate may be compared to the sentiment baseline, to indicate an impact of the spatiotemporal event. The descent rate may indicate the lasting sentiment impact of the event. A slower descent rate to the baseline may indicate that the positive sentiment impact of the event was long lasting. A fast descent rate to the baseline may indicate that the positive sentiment impact of the event was short.

Optionally, a decrease in sentiment for the specific spatiotemporal event relative to the sentiment baseline is computed. The decrease indicates a sentiment impact of the event, e.g., the event made people upset. The larger the decrease, the larger the negative sentiment impact. Alternatively or additionally, an increase rate from the decrease in sentiment for the specific spatiotemporal event until the sentiment baseline is computed. The increase rate may be computed by iteratively computing the sentiment using corresponding sequentially posted user generated content items. The increase rate may be compared to the sentiment baseline, to indicate an impact of the spatiotemporal event. The increase rate may indicate the lasting sentiment impact of the event. A slow increase rate to the baseline may indicate that the negative sentiment impact of the event was long lasting. A fast increase rate to the baseline may indicate that the negative sentiment impact of the event was short.

Optionally, in one or more of the implementations described above referring to using the sentiment baseline, the data used to compute the sentiment baseline is fed into a predictive ML model that generates an outcome of a prediction of a current sentiment value. Alternatively or additionally, the sentiment baseline, optionally a history of sentiment values, are fed into the predictive ML model. The current sentiment value predicted by the predictive ML model is compared to the target sentiment value, which represent the actual sentiment value. Since the predicted current sentiment value is expected to match the target sentiment value (e.g., within a statistical margin of error), a deviation of the target sentiment value from the predicted current sentiment value may be attributed to the event/topic, indicating a sentiment impact of the event/topic. The predictive ML model may be trained on a training dataset of multiple records, each including historical sentiment values, and a sample target sentiment value as ground truth. In another implementation, the predictive ML model may be trained on a training dataset of multiple records each including historical sensor data and/or historical content item (e.g., along and/or in combination), optionally as a sequence, with a predicted sentiment value as ground truth.

At 316, the sentiment value, and/or the results of the sentiment analysis may be provided, for example, presented on a display of a client terminal, stored in a data storage device, forwarded to a remote computing device, and/or provided as input into another process for further processing.

Referring now back to FIG. 8, at 802, content items are obtained. The content items may have associated automatically generated geo-tags, for example, as described with reference to FIG. 2A. At 804, a category analyzer may cluster the content items, as described herein. Category refers to topic, optionally for a specific geographical location, and/or event, as described herein. At 806, a relevant set of content items of a specific cluster may be selected, for example, for a specific event and/or specific topic, as described herein. At 808, a sentiment analyzer analyzes the content items of the selected cluster, optionally in combination with sensor data depicting the topic and/or event, as described herein. At 810, an output indicating the sentiment for the topic and/or event is obtained, for example, from a ML model, as described herein. At 812, the output may be presented geographically, for example, visually presented on a map, or split by other criteria.

An example of applying at least one implementation described herein is now described. The case is to perform a sentiment analysis of a parade held on Jan. 18, 2020 in a specific city. The event may be obtained from a city database listing cultural events. A list of police units, health department units, and fire department units that were assigned to the parade is obtained from a city database. The locations of the units on the day of the parade is obtained from the city dataset. The dynamic location of the parade over time is obtained from the city dataset, i.e., the route of the parade through different streets at planned times. User generated content items are selected, according to existing geo-tags corresponding to the location of the parade, and automatically generated geo-tags corresponding to the location of the parade (automatically created as described herein). The number of items in a corpus of user generated content items with geo-tags corresponding to the date and location of the parade is much larger using the automatically generated tags (as described herein) in comparison to using only existing geo-tags. A sentiment analysis is performed on the items in the corpus, as described herein, optionally including videos, audio files, and/or images of the parade. The sentiment analysis may indicate, for example, whether people complained about garbage left over from the parade, and whether people who attended the parade were happy with the music.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant content items will be developed and the scope of the term content item is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for automatically computing a sentiment for a specific topic, comprising:
    a server; and
    a hardware processor of a computing device executing code for a client terminal which is in communication over a network with said server, said hardware processor executing code for:
        extracting data captured by at least one sensor installed in a public place and depicting people activity in a specific geographic location corresponding to a respective topic, analyzing said extracted data to identify an indication of a sentiment value by estimating people sentiments expressed by said activity in said captured data and labelling said captured data with said indication, said at least one sensor installed in said public place is selected from a group consisting of still cameras, infrared cameras, video cameras and audio sensors;
        providing to said server, an indication of the specific geographic location, the respective topic, and the data captured by the at least one sensor; and
        receiving, from the server, a target sentiment value for the respective topic, wherein the server executes code for:
            for each of a plurality of user generated content items uploaded to a social network from a plurality of different client devices:
                selecting a specific geographic region mapping dataset of a plurality of geographic region mapping datasets corresponding to a specific geographic region identified by an analysis of the respective user generated content post,
                mapping by the specific geographic region mapping dataset, a generic term to a specific geographic location within the specific geographic region,
                tagging the respective user generated content item with a geo-location tag of the specific geographic location within the specific geographic region;
            clustering the user generated content items according to geo-location tags and topics into a plurality of topics;
            selecting at least one cluster matching the indication of the specific geographic location and the respective topic received from the client terminal;
            inputting a combination of a plurality of user generated content items of the selected at least one cluster and the labelled extracted data captured by the at least one sensor received from the client terminal into a machine learning (ML) model trained on a training dataset of a combination of user generated content items and data captured by the at least one sensor and labelled with said indication of said sentiment value; and
            obtaining a target sentiment value for the respective topic as an outcome of the ML model.

2. The system of claim 1, at least one of: (i) wherein the specific topic is defined for a specific geographic location in the specific geographic region, wherein selecting comprises selecting the subset of the plurality of user generated content items having geo-location tags matching a specific spatiotemporal event, wherein extracting comprises extracting data captured by at least one sensor depicting people activity in the specific geographic location, and (ii) wherein the specific topic is a specific spatiotemporal event defined for a specific time interval in a specific geographic location in the specific geographic region, wherein selecting comprises selecting the subset of the plurality of user generated content items having geo-location tags and timestamps matching the specific spatiotemporal event, wherein extracting comprises extracting data captured by at least one sensor depicting people activity in the specific geographic location at the specific time interval.

3. The system of claim 1, wherein said hardware processor executing additional code for:
    computing a sentiment baseline as an outcome of inputting into the ML model a baseline plurality of user generated content items having a timestamp external to a specific time interval and/or geographic location external to a specific geographic location of a specific spatiotemporal event; and
    analyzing the sentiment value for the specific spatiotemporal event relative to the sentiment baseline.

4. The system of claim 1, wherein said hardware processor executing additional code for:
    computing a sentiment baseline as an outcome of inputting into the ML model the baseline plurality of user generated content items having a timestamp external to a specific time interval of a specific spatiotemporal event and geographic location matching a specific geographic location of the specific spatiotemporal event; and
    analyzing the sentiment value for the specific spatiotemporal event relative to the sentiment baseline.

5. The system of claim 1, wherein said hardware processor executing additional code for:
computing a sentiment baseline as an outcome of inputting into the ML model the baseline plurality of user generated content items having a timestamp matching a specific time interval of a specific spatiotemporal event and geographic location external to a specific geographic location of the specific spatiotemporal event; and
analyzing the sentiment value for the specific spatiotemporal event relative to the sentiment baseline.

6. The system of claim 5, wherein a first historical sentiment profile of a plurality of sentiment values computed over a historical time interval computed for the geographic location external to the geographic region of the specific spatiotemporal event has a distribution that is similar to a second historical sentiment profile of a plurality of sentiment values computed over the historical time interval for the geographic region of the specific spatiotemporal event.

7. The system of claim 1, wherein said hardware processor executing additional code for:
computing a sentiment baseline as an outcome of inputting into the ML model a baseline plurality of user generated content items indicating content external to a specific spatiotemporal event and having a timestamp matching to a specific time interval of the specific spatiotemporal event and/or geographic location matching a specific geographic location of the specific spatiotemporal event; and
analyzing the sentiment value for the specific spatiotemporal event relative to the sentiment baseline.

8. The system of claim 1, wherein said hardware processor executing additional code for:
clustering the subset of the plurality of user generated content items into at least two clusters according to a respective user type,
for each of the at least two clusters, computing a respective cluster sentiment value as an outcome of inputting into the ML model user generated content items of the respective cluster, thereby computing a plurality of cluster sentiment values; and
analyzing the plurality of cluster sentiment values by evaluating a first cluster sentiment value relative to a second cluster sentiment value.

9. The system of claim 1, wherein said hardware processor executing additional code for:
identifying a plurality of users that posted the plurality of user generated content items; and
wherein performing the sentiment analysis comprises:
computing a sentiment baseline as an outcome of inputting into the ML model a baseline plurality of user generated content items comprising a plurality of historical user generated content posted by the plurality of user prior to a specific spatiotemporal event; and
analyzing the sentiment value for the specific spatiotemporal event relative to the sentiment baseline.

10. The system of claim 9, wherein said hardware processor executing additional code for computing an increase in sentiment for the specific spatiotemporal event relative to the sentiment baseline, and/or computing a descent rate from the increase in sentiment for the specific spatiotemporal event until the sentiment baseline, the descent rate computed by iteratively computing the sentiment using corresponding sequentially posted user generated content items,
wherein the descent rate compared to the sentiment baseline indicates an impact of the spatiotemporal event.

11. The system of claim 9, wherein the plurality of historical user generated content items match the specific geographic region of the specific spatiotemporal event prior to the specific spatiotemporal event.

12. The system of claim 11, wherein said hardware processor executing additional code for computing an increase in sentiment for the specific spatiotemporal event relative to the sentiment baseline, and/or computing a descent rate from the increase in sentiment for the specific spatiotemporal event until the sentiment baseline, the descent rate computed by iteratively computing the sentiment using corresponding sequentially posted user generated content items, wherein the descent rate compared to the sentiment baseline indicates an impact of the spatiotemporal event.

13. The system of claim 1, wherein said hardware processor executing additional code for:
iteratively inputting into the ML model, a historical combination of the subset of the plurality of user generated content items and the extracted data captured by the at least one sensor obtained for a historical plurality of time intervals, to obtain a plurality of historical sentiment values indicating a baseline sentiment profile,
inputting the baseline sentiment profile into a sentiment ML model that generates an outcome a predicted sentiment value for a current time interval corresponding to a time interval of the sentiment value; and
analyzing the sentiment value relative to the predicted sentiment value.

* * * * *